United States Patent
Wells et al.

(10) Patent No.: US 11,989,267 B2
(45) Date of Patent: May 21, 2024

(54) BLOCKCHAIN ENCODING SYSTEM

(71) Applicant: Black Atom Technologies, Inc., Lewes, DE (US)

(72) Inventors: Logan A. Wells, Lewes, DE (US); Rick Anthony Wells, Lewes, DE (US)

(73) Assignee: Black Atom Technologies, Inc., Lewes, DE (US)

( * ) Notice: Subject to any disclaimer, the term of this patent is extended or adjusted under 35 U.S.C. 154(b) by 0 days.

(21) Appl. No.: 18/352,113

(22) Filed: Jul. 13, 2023

(65) Prior Publication Data

US 2024/0070234 A1    Feb. 29, 2024

Related U.S. Application Data

(60) Provisional application No. 63/373,818, filed on Aug. 29, 2022.

(51) Int. Cl.
*H04L 9/40* (2022.01)
*G06F 21/10* (2013.01)
(Continued)

(52) U.S. Cl.
CPC ......... *G06F 21/1014* (2023.08); *G06N 20/00* (2019.01); *H04L 9/3213* (2013.01); *H04L 9/50* (2022.05)

(58) Field of Classification Search
CPC ....... G06F 21/1014; G06N 20/00; H04L 9/50; H04L 9/3213
See application file for complete search history.

(56) References Cited

U.S. PATENT DOCUMENTS 9,849,364 B2   12/2017   Tran et al.
11,295,318 B2   4/2022   Andon et al.
(Continued)

OTHER PUBLICATIONS

"Case Study: Car Ownership Token," Tokenization; AlphaWallet, 8 pages. [Retrieved from Internet on Jul. 18, 2023 from https://alphawallet.com/for-business/car-ownership-on-blochchain/] (2023).
(Continued)

*Primary Examiner* — Ghodrat Jamshidi
(74) *Attorney, Agent, or Firm* — Hamilton, Brook, Smith & Reynolds, P.C.

(57) ABSTRACT

Embodiments securely control an electronic asset. In some embodiments, a computer-implemented method of securely controlling an electronic asset includes identifying an asset NFT pertaining to the electronic asset. An ownership status of the electronic asset is computationally evaluated according to a proof of ownership provided by an owner node paired with the electronic asset. Responsive to evaluating the ownership status of the electronic asset, the asset NFT is bound with a representation of an identity of the owner node or of an authorized user node paired with the electronic asset. The bound representation of the identity and the asset NFT are registered on a blockchain associated with the electronic asset. A task is computationally performed involving the electronic asset, and the bound representation of the identity, and the electronic asset is securely controlled, in response to receiving a task request from the owner node or the authorized user node.

27 Claims, 17 Drawing Sheets

(51) Int. Cl.
*G06N 20/00* (2019.01)
*H04L 9/00* (2022.01)
*H04L 9/32* (2006.01)

(56) References Cited

U.S. PATENT DOCUMENTS

| | | | | |
|---|---|---|---|---|
| 11,558,344 | B1* | 1/2023 | Pezeshki | H04L 12/66 |
| 11,830,309 | B2* | 11/2023 | Nelson | G07F 17/3244 |
| 2017/0116693 | A1 | 4/2017 | Rae et al. | |
| 2019/0238525 | A1* | 8/2019 | Padmanabhan | H04L 63/101 |
| 2020/0119905 | A1* | 4/2020 | Revankar | G06Q 20/06 |
| 2020/0183950 | A1* | 6/2020 | Gaillardetz | G06F 16/258 |
| 2020/0286049 | A1* | 9/2020 | Basu | G06Q 20/223 |
| 2022/0164240 | A1* | 5/2022 | Kim | G06F 9/5027 |
| 2023/0237454 | A1* | 7/2023 | Rulli | G06Q 20/1235 705/51 |
| 2023/0246835 | A1* | 8/2023 | Sharma | H04L 9/3239 713/168 |
| 2023/0289410 | A1* | 9/2023 | Shulman | H04L 9/3239 |
| 2023/0298001 | A1* | 9/2023 | Jethmalani | G06Q 20/3678 705/65 |
| 2023/0308276 | A1* | 9/2023 | Bathen | H04L 9/3236 |
| 2023/0353355 | A1* | 11/2023 | Meyers | H04L 9/088 |
| 2023/0360031 | A1* | 11/2023 | DeLuca | G06Q 20/3821 |

OTHER PUBLICATIONS

Ingram, D., "Crypto Boom Opens Door to a New Class of Landlords," [Retrieved from Internet on Jul. 18, 2023 from https://www.nbcnews.com/tech/crypto/crypto-real-estate-investment-landlords-rcna20029] (2022).

Arcenegui, J. et al., "Secure Management of IoT Devices Based on Blockchain Non-fungible Tokens and Physical Unclonable Functions," International Conference on Applied Cryptography and Network Security Workshops, Oct. 2020, Springer, pp. 24-40.

Wolf, M., "Here are the Details about Flyfish Club, Gary Vaynerchuk's NFT Restraurant Opening in 2023," pp. 1-9, [Retrieved from Internet on Jul. 18, 2023 from https://thespoon.tech/here-are-the-details-about-flyfish-club-gary-vaynerchuks-nft-restaurant-opening-in-2023/] (2023).

Singh, J., "Introducing Tangible," [Retrieved from Internet on Jul. 18, 2023 from https://medium.com/tangible/introducing-tangible-5f3947276125] (2023).

"Own an NFT Share of This Actual Income Producing Investment Property," Landlords NFT | The first NFT project offering Real World utility, pp. 1-15 [Retrieved from Internet on Jul. 18, 2023 from https://https://web.archive.org/web/20220417041044/https://landlordsnft.xyz/]. (2023).

"ReNFT Project Proposal," [Retrieved from Internet on Dec. 5, 2022 from https://www.notion.so/reNFT-Project-Proposal-75fd2bb4545e401bb91e26541e21328c], pp. 1-9 (2022).

Selot, S., "Smart Contracts and NFTs: Enabling Smart Communication for IoT Devices," Coinmonks, Medium, pp. 1-12, [Retrieved from Internet on Jul. 18, 2023 from https://medium.com/coinmonks/smart-contracts-and-nfts-enabling-smart-communication-for-iots-1675383a079f] (2023).

"What are NFTs and are they the Future of Car Ownership?," Carnomaly (https://carnomaly.io/what-are-nfts-and-are-they-the-future-of-car-ownership), 5 pages (no date given).

* cited by examiner

BLOCKCHAIN ENCODING SYSTEM

RELATED APPLICATION

This application claims the benefit of U.S. Provisional Application No. 63/373,818, filed on Aug. 29, 2022. The entire teachings of the above application are incorporated herein by reference.

BACKGROUND

In 2008, Satoshi Nakamoto unveiled a technology that would revolutionize and forever change the world in which we live. Through Bitcoin, Satoshi introduced and outlined a new system of payment which uses secure ledgers to permanently record transactions. Today, that new system of payment is widely known as "blockchain technology." As the technology progressed, applications considered previously unthinkable were created through networks such as Ethereum. This made "smart contracts" (a term originally coined in 1994 as merely an idea), once deemed impractical, now a technological reality. Smart contracts allow two parties to come to an agreement, at which point the stipulations of the contract are met, fulfilling the obligations of both entities, without the necessity of a third-party.

Another technology made possible through networks such as Ethereum was non-fungible tokens (NFTs). NFTs are unique intangible pieces of data that cannot be copied or reproduced, which became especially popular in the years 2021-2022 up until the present day. While these technologies were being born, the groundwork for another revolutionary technology was laid, called 5G Technology, allowing instantaneous, data-intensive, complex communications between devices, enabling a system of such devices referred to as the Internet of Things (IoT).

SUMMARY

Embodiments of the disclosure provide technology for permissions-based control of electronic assets and associated devices. Such technology includes aspects of artificial intelligence (AI) and machine learning (ML) based oracle systems, blockchain networks, smart contracts, and wireless telecommunications, configured to promote security and flexibility in management of electronic assets. According to an aspect, the wireless communications may be 5G or other high-speed wireless communications, or any other wireless communications known in the art. NFTs represent a core part of the security strategy, enabling identity verification and mapping of various types of users to different levels of permissions associated with a given asset or representation thereof, e.g., an electronic asset. Embodiments of the present invention are directed to methods and systems for securely controlling access to one's assets, including by means of the aforementioned technologies.

Such assets may be of a physical nature, or may include intellectual property, or may be inherently digital. Assets referred to herein as "electronic assets" may simply be such inherently digital assets, or may be considered electronic representations of such physical or intellectual property assets. Electronic representations, as such, may include database entries, blockchain records, or other encoded forms of computer-readable information.

In some embodiments, a computer-implemented method of securely controlling an electronic asset includes identifying an asset NFT pertaining to the electronic asset. The method further includes computationally evaluating an ownership status of the electronic asset according to a proof of ownership provided by an owner node. The owner node is paired with the electronic asset. The method further includes, responsive to evaluating the ownership status of the electronic asset, binding the asset NFT with a representation of an identity of the owner node or a representation of an identity of an authorized user node. The authorized user node is paired with the electronic asset. The method further includes registering the bound representation of the identity and the asset NFT on a blockchain associated with the electronic asset. The method further includes computationally performing a task involving the electronic asset, and the bound representation of the identity, in response to receiving a task request from the owner node or the authorized user node, and securely controlling the electronic asset.

In some embodiments, the representation of the identity includes an ID NFT. The method further includes generating ID NFT(s) respectively corresponding with node(s) associated with the electronic asset. The generated ID NFT(s) may include biometric identity data pertaining to the corresponding node(s) and/or user(s) thereof. The generated ID NFT(s) may further include the ID NFT. The node(s) may include the owner node and/or the authorized user node.

In some embodiments, identifying the asset NFT pertaining to the electronic asset includes tokenizing the electronic asset by encoding or generating the asset NFT or importing a previously minted asset NFT pertaining to the electronic asset.

In some embodiments, the method further includes, prior to identifying the asset NFT pertaining to the electronic asset, verifying authenticity and ownership of the electronic asset by configuring an AI oracle or module to train a model for the authenticity and ownership of the electronic asset based upon external data source(s).

In some embodiments, the generated ID NFT(s) respectively confer permissions upon the owner node, and upon the authorized user node, with regard to the electronic asset, such that the permissions conferred upon the owner node are broader than the permissions conferred upon the authorized user node. The permissions conferred upon the owner node may include a permission to assume control of the electronic asset from the authorized user node at any time.

In some embodiments, the task includes fulfillment of a smart contract or term(s) thereof to allow the authorized user node to access the electronic asset. The smart contract includes aspects of a security protocol. In other embodiments, the task may include initiating allowance of the authorized user node to access the electronic asset according to restriction(s), or initiating restriction of access to the electronic asset in response to the authorized user node failing to meet a pre-defined condition. The restriction(s) may include a predefined time interval, a geographic restriction, a location restriction, a financial restriction, a behavioral restriction, an amenity restriction, and/or geofencing. In yet other embodiments, the task may include authenticating the electronic asset or configuring settings related to the electronic asset.

In some embodiments, the method further includes configuring a scoring engine to track a computational value pertaining to the electronic asset. The computational value may correspond to a score associated with the owner node or the authorized user node, a worth of the electronic asset, or a risk level associated with the performing of the task involving the electronic asset. The computational value may be an aggregate value if the electronic asset belongs to multiple such assets. In other embodiments, where the computational value corresponds to the worth of the electronic asset, the method may further include configuring an AI oracle or module to train a model for the computational value based upon descriptive data relating to the electronic asset. The AI oracle or module may interface with a ML oracle or module, or may otherwise include a ML system. Further, in yet other embodiments, where the computational value corresponds to the score associated with the owner node or the authorized user node, the method may further include configuring an AI oracle or module to train a model for the computational value based upon behavioral data. The AI oracle or module may interface with a ML oracle or module, or may otherwise include a ML system.

In some embodiments, the electronic asset includes an IoT device, and the task includes an operational action of the IoT device. The IoT device may be deployed in, e.g., a smart home or a smart office environment.

In some embodiments, the method may further include generating multiple ID NFTs and coupling respective ID NFTs thereof with corresponding electronic assets of a plurality of electronic assets. The task may include initiating allowance of the authorized user node to access multiple electronic assets of the plurality thereof. The plurality of electronic assets may include, e.g., a trust account or a business.

In other embodiments, a computer-based system for securely controlling an electronic asset includes a blockchain encoding system. The blockchain encoding system includes a blockchain computing node, a ML oracle system, an encoder, a registration node, and a computing node. The blockchain computing node is configured to identify an asset NFT pertaining to the electronic asset. The ML oracle system is configured to computationally evaluate an ownership status of the electronic asset according to a proof of ownership provided by an owner node. The owner node is paired with the electronic asset. The encoder is configured to respond to the ML oracle system based on the ownership status of the electronic asset by encoding or generating the asset NFT with an embedded smart contract configured to automatically attest a representation of an identity of the owner node or a representation of an identity of an authorized user node. The authorized user node is paired with the electronic asset. The registration node is configured to register the asset NFT with the attestation of the representation of the identity on a blockchain. The computing node is configured to perform a task involving the electronic asset, and the attestation of the representation of the identity, in response to receiving a task request from the owner node or the authorized user node, and securely control the electronic asset.

In computer-based system embodiments, the nodes may be configured to perform operations to implement any embodiments or combination of embodiments described herein.

In some embodiments, a computer-implemented method of securely controlling an electronic asset includes identifying an asset NFT pertaining to the electronic asset. The method further includes evaluating an ownership status of the electronic asset according to a proof of ownership provided by an owner node. The method further includes binding the asset NFT with a representation of an identity of an authorized user node. The method further includes tracking the asset NFT on a blockchain associated with the electronic asset. The method further includes performing a task involving the electronic asset in response to receiving a task request from the authorized user node, and securely controlling the electronic asset. In other embodiments, identifying the asset NFT pertaining to the electronic asset includes tokenizing the electronic asset by encoding or generating the asset NFT or importing a previously minted asset NFT pertaining to the electronic asset. In still other embodiments, a computer-based system for securely controlling an electronic asset includes nodes configured to perform any or all of the method steps of the aforementioned computer-implemented method embodiment.

In some embodiments, a computer-implemented method of transferring an electronic asset from a first online environment to a second online environment includes importing the electronic asset from the first online environment. The method further includes storing the electronic asset in a digital vault. The method further includes identifying an asset NFT corresponding to the electronic asset. The method further includes performing an assessment of the electronic asset. The method further includes modifying the electronic asset to include the performed assessment. The method further includes generating a first code corresponding to the electronic asset. The method further includes generating a second code based on the first code. The second code is configured to cause the electronic asset to operate in the second online environment. The method further includes configuring a smart contract to securely control the electronic asset and the identified asset NFT. The method further includes linking the identified asset NFT with the second code. The identified asset NFT is configured to unlock the second code via the configured smart contract. The method further includes exporting the electronic asset to the second online environment. In other embodiments, identifying the asset NFT corresponding to the electronic asset includes tokenizing the electronic asset by encoding or generating the asset NFT or importing a previously minted asset NFT corresponding to the electronic asset. In still other embodiments, the method further includes determining a first set of properties of the first online environment. The method further includes determining a second set of properties of the second online environment. The method further includes performing a comparison of the first set of properties and the second set of properties. The method further includes, based on the comparison, modifying attribute(s) of the electronic asset to ensure compatibility of the electronic asset with the second online environment.

In some embodiments, a computer-based system for distributed digital asset storage and electronic transaction processing includes a blockchain network, server(s), and node(s) operatively communicating with the server(s) via the blockchain network. Each of the node(s) includes a memory or memories and processor(s). The server(s) are configured to store electronic asset(s) in the memory or memories of the node(s). In addition, the server(s) are configured to process transaction(s) on the blockchain network using the processor(s) of the node(s). The server(s) are further configured to determine a reward value for a given node of the node(s). The reward value is based on reliability of the given node, availability of the given node, storage space of a memory or memories of the given node, computing cycles of processor(s) of the given node, a computational aggregate value corresponding to the given node, and/or a computational aggregate score corresponding to the given node.

In other embodiments, a computer-implemented method for translation of a digital item in a first online environment includes creating a smart contract. The method further includes, generating, via the created smart contract, translation code for the digital item based on native code of the digital item. The native code corresponds to a content of the digital item in the first online environment, and the translation code represents one or more unique attributes of the digital item. In addition, the translation code is configured to make the digital item usable in additional online environment(s). The additional online environment(s) are different from the first online environment.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

Figure 1:
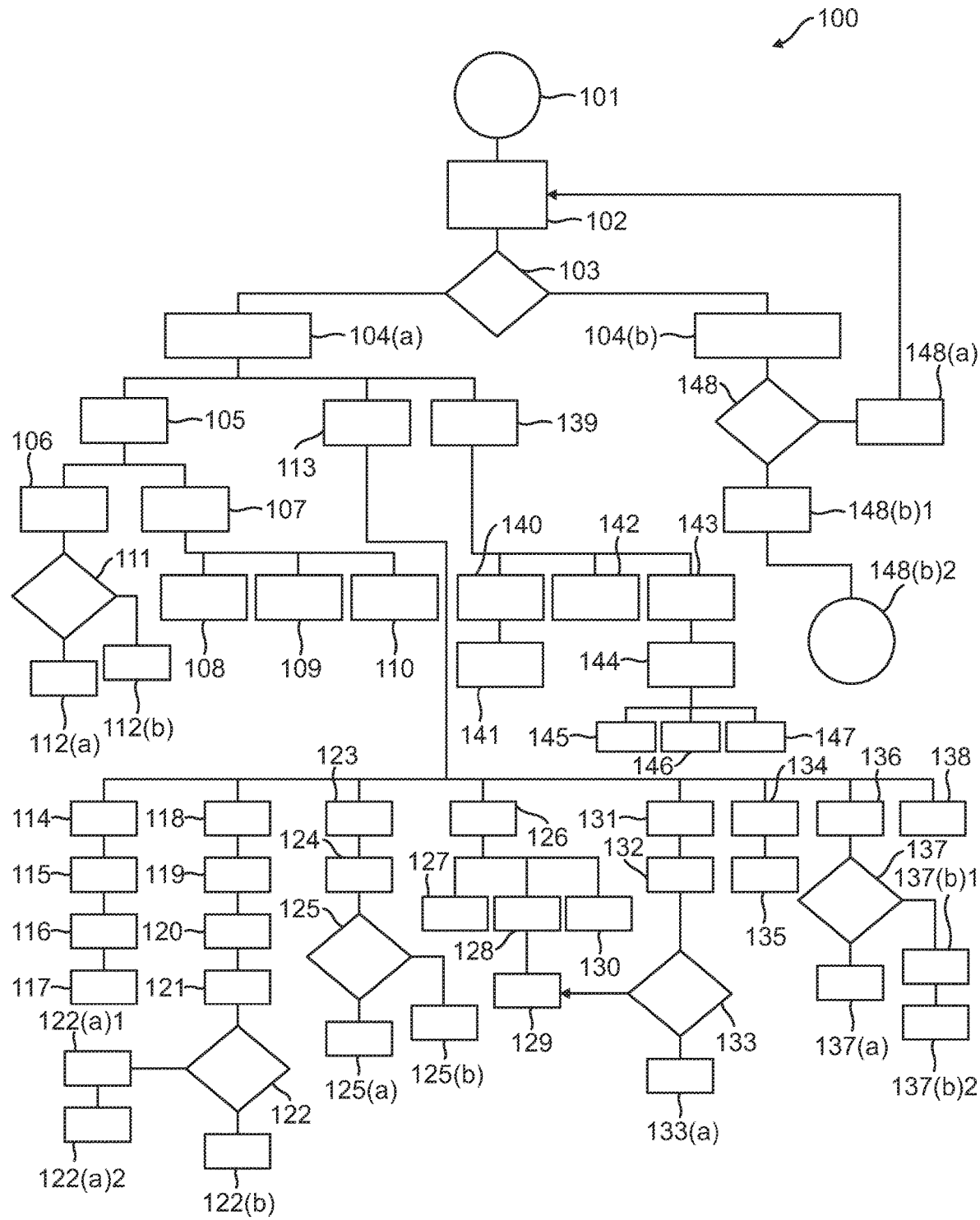
FIG. 1 is a flow diagram of a blockchain encoding system according to an example embodiment.

A description of example embodiments follows.

Presently disclosed herein is a software application that utilizes blockchain technology, smart contracts, and wireless technology to create permissions through non-tangible, e.g., digital, representations of tangible assets or of assets that are inherently digital, and uses AI/ML to verify their authenticity and enhance their usability. In an embodiment, the wireless technology may be 5G or other high-speed wireless technology, or any other wireless technology known in the art. Non-tangible representations may be enhanced by using non-fungible tokens (NFTs), to be referred to as asset NFTs. Such asset NFTs may be created, or minted, to be coupled with digital representations of tangible assets such as real estate, vehicles (including, but not limited to rental cars), apartments, condominiums, hotel rooms, employee IDs (including, but not limited to status indications and security clearance levels). Asset NFTs may also be created to be coupled with instances of inherently digital assets, such as an amount of currency as in a loan, something of value in a gaming environment, etc.

The software application may interact with various electronic devices, such as locks, temperature controls, and lights that may be deployed within a smart home or a smart office environment associated with a home or office whose corresponding asset NFT the software application creates or otherwise accesses. The software application may, alternatively or in addition, interact with wireless networking access points; electric vehicle charging stations; hotel room/pool/exercise facility access systems, and rental car/personal vehicle access systems. The software application may implement permissions via the asset NFT and apply such permissions to an electronic device, in conjunction with an interaction with the electronic device, by wireless communication, e.g., via 5G or other high-speed wireless technology. Electronic devices, as such, may comprise an internet of things (IoT) implementation of connected devices, or of client devices or servers configured to run a software program, such as a bank website or an online game, through which inherently digital assets may be accessed. Such a software application may allow users to share and trade NFTs temporarily for a certain period of time, or, if desired, at regularly scheduled times, giving a party possessing the NFT access to said permissions for a time, at an owner's discretion, through the use of predetermined smart contracts.

Smart contracts and/or digital assets such as NFTs may be deployed or hosted within a metaverse environment, and the software application may be configured to access such a metaverse environment so as to interact with said smart contracts and/or digital assets as described above. Metaverse environments in which the software application may be configured to operate include gaming environments such as massively multiplayer online games, immersive e-commerce environments, and social networking, among other possible virtual reality (VR) realizations. Digital assets, as such, may exist entirely within the metaverse environment, such as virtual clothing, or virtual fighting or sporting equipment to be used within an online game, or may digitally represent a corresponding real-world asset, such as actual apparel offered for sale within an immersive virtual mall.

The aforementioned software application thus connects NFTs of various assets, including inherently digital assets and tangible objects, with various permissions to be afforded to a user of such assets, and allows the disclosed technologies to interact seamlessly. Restated, the application thus bridges the gap between such autonomous technologies, while enabling an asset owner to allow any entity that the asset owner deems fit to temporarily—or permanently, depending on the contract—give access to permissions of the assets. The application may serve as a one-stop pass for multiple tangible objects or assets, including theme park tickets, concert tickets, casinos, vacation rentals, Airbnb®s, contractor/subcontractor work, heavy/industrial equipment, and aircraft/jet-sharing, etc. Moreover, digital assets and their corresponding ownership may be validated, stored, tracked, modified, and given permissions through the aforementioned software application. A few different example implementations are described below.

According to an embodiment, the disclosed software application may function as a medium of exchange, or place of storage, between two or more metaverses or other online environments. For example, digital assets may be stored on the software application when not in use. This allows digital assets (such as a vehicle used in a metaverse) to be taken from one environment, stored on the software application, imbued with permissions and terms of use (which may be customized for a specific user), modified (e.g., given an "appropriateness rating"), and then sent to another user (either temporarily or permanently) for use in a completely different environment than where the digital asset originated from. In this way, using the aforementioned software application to store digital assets in between metaverses and other online environments provides users with total control over their digital assets.

Further, in another embodiment, an example modification of a digital asset may include tagging the digital asset with one or more appropriateness ratings that determine the digital asset's appropriateness for one or more corresponding metaverses or other online environments. According to an aspect, an appropriateness rating may include a maturity rating. In an implementation, an appropriateness rating may measure one or more aspects of a digital asset, such as language tone/style, nudity/partial nudity, sexual content, violent content, etc. Examples of digital assets including aspects and/or content relevant to determination of an appropriateness rating may include: revealing or explicit digital apparel/gear, digital assets involving or depicting gore or violence, digital assets involving sexual gear/content that may be inappropriate for certain environments, etc. In one such embodiment, the appropriateness rating feature may interact with applications/environments that may be geared toward minors or that allow parental monitoring/controls. AI/ML algorithms may be used to assess appropriateness and assign one or more ratings to digital assets. Thus, assigning to a digital asset one or more appropriateness ratings that each correspond to a given metaverse or other online environment allows the digital asset to be used across multiple environments that may have different content rating systems, and in turn supports interoperability.

In an example embodiment, a landlord may lease an asset NFT that represents her property. The asset NFT may be of a tokenized form of, for example, a deed, inspection papers, etc. The assets NFT may then be controlled by the disclosed software application via a smart contract. The asset NFT may be linked to various luxuries provided by the landlord. These luxuries may include "smart house" features (e.g., temperature control, locks, lights, etc.), wireless Internet access, electric charging stations, laundry services, and other services that a landlord may provide. In an event that obligations of the tenant are not met, the disclosed software application may notify the tenant that they have a certain period of time to meet the contract's obligations before the application reclaims the asset NFT, and therefore the permissions given by the asset NFT, thus disconnecting the tenant from the previously enjoyed luxuries. The prospect of loss of access to such luxuries may incentivize tenants to pay rent in full and on time, and in return save the landlord from costly evictions and undesirable damages to landlord-tenant relationships, while saving tenants from a blemished rent history. Similar concepts may be alternatively applied to hotels, rental cars, memberships, and employee IDs.

In another example embodiment, via the disclosed software application, an NFT may be configured to permit privileges that a position of chief executive officer (CEO) of a company entitles to a holder of the position. Such an NFT may be referred to as a CEO NFT. A company may obtain at least one CEO NFT. Privileges permitted by such a CEO NFT may include, but not be limited to, security clearances, options, and votes. Intermediate NFTs may be issued to board members of the company, who may then use their NFTs to set policy at board meetings. Common NFTs may similarly be issued to afford lesser permissions to janitors or contractors for the company, while recording all pertinent data related to these persons. Such pertinent data may include, but not be limited to locations, transactions, and duties completed. CEO NFTs, Intermediate NFTs, and Common NFTs may be examples of identity (ID) NFTs, to be described in more detail hereinbelow.

Yet another example embodiment includes agreements involving various assets between two individuals. Such an embodiment may include a person-to-person (p2p) rental or borrowing protocol that allows users to temporarily transfer asset NFTs in order to securely bring any asset that has a rentable use case, whether in the digital or physical realm, on-chain. Such a protocol may be applicable to physical or digital real estate, or other commodities. For instance, if an owner of a vehicle wanted to temporarily allow another individual, e.g., a borrower, the use of his vehicle, the disclosed software application may enable said owner to extend access of the vehicle's asset NFT to the borrower for a period of time (e.g., one hour, two hours, two days, one week, or another amount of time). Such extension of access may include obligating the borrower to a set of stipulations agreed to in an associated smart contract. Such embodiments may incentivize insurance companies to provide micro-insurance policies, thus monetizing transactions, while protecting the parties involved. A car may thus function as an IoT device operating as a smart digital asset under auspices of the software application and associated NFT, using blockchain technology.

Continuing with the vehicle rental/lending embodiment above, the associated smart contract may be configured to enforce various restrictions on use of the vehicle. These may be restrictions based on time, geography, location, financial criteria, behavioral criteria, perquisites and/or amenities relating to the vehicle, and geofencing, etc. For example, the vehicle may be configured to emit beeping sounds and/or generate other warnings, alerts, or notifications to indicate that a borrower or renter node is not in compliance with the smart contract restrictions. The vehicle may be configured to cease such behavior once the node returns to compliance. Further, an aggregate score of the ID NFT associated with the node may be reduced or lowered in accordance with instances where the node violates or deviates from one or more smart contract restrictions. In the case of an autonomous vehicle, smart contract restrictions may be enforced such that a violation or deviation from the restrictions will result in the vehicle being prevented from entering certain areas and/or from continuing service. The autonomous vehicle may be configured to pull into or proceed to a safe/secure predefined location and refrain from further operation until compliance with the smart contract restrictions is reestablished.

Further, in another example embodiment, an NFT may be configured to grant, manage, track, monitor and/or withdraw benefits, amenities, and/or privileges to patrons of a casino. Such benefits, amenities, and/or privileges may include, but are not limited to, assorted perquisites for casino patrons, casino member IDs, very important person (VIP) access, e.g., to specified casino tables or games/contests, and access to certain rooms and/or areas in a casino.

Some embodiments may incorporate a permissions paradigm similar to the four-tier system developed by Nobel Prize winning economist Elinor Ostrom called the "Pyramid of Rights." In the paradigm, the lowest level may be an authorized user of an asset, while the highest level may be an owner of the asset. Authorized users may be thus afforded limited permissions, which may include accessing and/or withdrawing resources. Claimants may be afforded at least the same permissions as an authorized user, in addition to an ability to exclude others from accessing the asset. Proprietors may hold management permissions pertaining to the asset that go beyond the aforementioned access and exclusion permissions. Owners of the asset may be afforded permissions to access, use, exclude others, manage, and sell the asset. Such a tier-based paradigm may be summarized as shown below:

Tier 4: authorized user(s)—may access and/or withdraw assets

Tier 3: claimant(s)—may have all permissions of lower level, e.g., higher numbered, tiers, along with permissions to exclude others from access Tier 2: proprietor(s)—may have all permissions of lower level, e.g., higher numbered, tiers, along with management rights beyond access and exclusion Tier 1: owner(s)—may at least have permissions to access, use, exclude others, manage, and sell/trade the asset.

In terms of the above four-tier system, or in terms of another system wherein an authorized user is afforded a narrower set of permissions than an owner, features disclosed as being available to an authorized user may also be available to entities at higher level, e.g., higher numbered, tiers, including the owner. In such embodiments, the owner can override actions initiated by entities occupying a lower level, e.g., higher numbered, tier.

In another example embodiment, a real estate property has an owner, which owner has a spouse and two children, all living in a house at the real estate property. A service person such as a dog walker may also be known to frequent the property. Each one of these people would have a unique ID NFT that would connect, via the software application, with an asset NFT associated with the real estate property, when they have authorized use for it. In such an example, the owner's husband may be afforded permissions of a proprietor, the children as claimants, and the dog walker as an authorized user, with the owner afforded override permissions, according to the aforementioned four-tier paradigm.

Embodiments thus build upon the four-tier paradigm described above by including various features. Such features include the ID NFT, introduced hereinabove, being configured to link with a specific asset NFT to establish accountability for the asset NFT. As such, either the owner or an authorized user (which authorized user may also be a proprietor or a claimant) may be registered as being in control of the asset NFT at a given time. Such features further include the various permissions granted through the software application and being afforded to an authorized user (or claimant, or proprietor, or owner, as the case may be) who has possession of the asset NFT. In an example from the context of a smart home environment established hereinabove, an asset NFT for a real estate property including such a smart home may be minted by the software application with permissions to enter the home through a smart lock, permissions to use a vehicle charging station that may be present on the property, and other potential smart home features of the property. Such features may further include the asset NFT being configured by the software application to afford the owner full control of an asset NFT, allowing the owner of an asset to revoke or re-assume control of the asset NFT from another authorized user (or claimant, or proprietor) at any time, and to set a schedule or a specific amount of time for which an authorized user (or claimant, or proprietor) may access the asset NFT.

In some embodiments, the software application may prompt and guide a user to mint an ID NFT according to an appropriate level of permissions for said user (e.g., whether the user should be afforded permissions of an owner, proprietor, claimant, or authorized user). Such minting of the ID NFT may be performed using similar methods that know-your-customer (KYC) regulated businesses use. Such minting of the ID NFT may include biometric verifications of the user via the software application and an associated client device. Biometric verifications may include fingerprint verification, voice verification, and facial recognition, enabled respectively by a fingerprint scanner, microphone, and camera deployed within, or in connection with, the client device.

Embodiments include various security features, such as a hardware security module (HSM) silicon integrated circuit (IC) chip with embedded firmware or a SIM (Subscriber Identity/Identification Module) card with a cryptographic protocol encryption-based security protocol. The HSM security protocol may utilize an embedded software application with access to at least a significant portion of a user's asset portfolio. Biometric verifications may be included in such features as introduced hereinabove. Such security features simultaneously require and facilitate authentication of ownership status of all physical, digital, and intellectual property (IP) assets that an owner wishes to register with the software application and use to generate an asset NFT therefor. The software application may be configured to verify a proof of authenticity of an asset and a proof of ownership thereof in order for the asset to be registered with the software application, and thereby made the basis of a newly minted asset NFT, thus preventing users from speciously minting NFTs for assets that they do not actually own.

In some embodiments, the HSM may be coupled to or encapsulate a trusted platform module (TPM). In an example, a computer-based system for securely controlling an electronic asset may be provided in a blockchain encoding system. The blockchain computing node may be configured to identify an asset NFT pertaining to the electronic asset. A ML oracle system may be configured to computationally evaluate an ownership status of the electronic asset according to a proof of ownership provided by an owner node, the owner node being paired with the electronic asset. An encoder may be configured to respond to the ML oracle system based on the ownership status of the electronic asset by encoding the asset NFT with an embedded smart contract configured to automatically attest a representation of an identity of the owner node or a representation of an identity of an authorized user node, the authorized user node being paired with the electronic asset. A registration node may be configured to register the asset NFT with the attestation of the at least one representation of the identity on a blockchain. A computing node may be configured to perform a task involving the electronic asset, and the attestation of the representation of the identity, in response to receiving a task request from the owner node or the authorized user node, and securely control the electronic asset.

In an embodiment, an asset NFT may be controlled by executing the asset NFT within a trusted application in an environment on a computing device in isolation from the primary operating system (OS) of the computing node/device. A unique device key may be generated for the computing device within the executed trusted application. The generated unique device key for the computing device may be registered with an access control application. The electronic asset and the access control application may be paired.

In conjunction with tokenizing assets that a user applies to the software application via the aforementioned asset NFTs, in embodiments, the software application may be configured to track a computational value pertaining to all such tokenized assets associated with a given user. The computational value, as such, may be interpreted as a net worth of said assets. The computational value, or an additional computational value, may alternatively or additionally be interpreted as a score to be associated with the given user. Such a score may be used to gauge trustworthiness of a user within the software application. The software application may be further configured to track any liens or pledges against said assets, and may accordingly adjust computational values associated with the given user to account for liabilities assumed from such liens or pledges.

Further, according to an embodiment, the software application may interface with an AI module to train a model for the computational value based upon descriptive data relating to the electronic asset. The AI module may in turn interface with a ML module, or may otherwise include a ML scheme. For example, descriptive data relating to the electronic asset may include, but is not limited to, comparative data with other similar assets, asset condition, asset type, asset location, asset scarcity/supply, demand for the asset, Kelley Blue Book Value (for vehicles), asset age, inspection results (for properties), professional or virtual/digital assessments, economic considerations, etc.

In some embodiments, such computational values may be used by the software application to track a user's level of responsibility and trustworthiness. If, as mentioned above, a user were to attempt to mint an NFT for an asset that they do not own, a computational value associated with the user may be accordingly adjusted, with such adjustment considered a penalty assessed to the user. Other penalties may be similarly enforced, such as limitations applied to permissions pertaining to various asset NFTs, to an ID NFT, of a user, or to functionality within the application. This may incentivize honesty and transparency among users and prevent bad actors from selling worthless NFTs. This would also make asset NFTs registered with the software application more valuable and sought-after than other NFTs. Overall, this increases security and trustworthiness of NFTs.

In an example embodiment, the software application may be configured to extend loans, monetary or otherwise, to users based on the associated computational values tracked by the software application. In another example embodiment, a computational value may function within the software application to show a user's credit-worthiness to third parties if the user lacks a traditional credit history. This encourages financial awareness in users and has potential for widespread scalability with other decentralized finance (DeFi) applications. Implementations of such DeFi applications may include online implementations of currency exchange platforms supported by blockchain architectures, and may further include such implementations deployed within a metaverse environment.

In another example embodiment, the software application may be configured to interface with an external financial account of a user, which account may include a credit card, debit card, and/or bank account. Permissions pertaining to an asset NFT of the account may be applied to a configuration of the software application that causes a given amount of currency to be reserved from the account for use by the software application. A creditor agent of the account may then be enabled by the application to permit the user (e.g., debtor agent) to disburse a percentage of the reserved funds to a third party through a payment portal associated with the software application. Such an arrangement may allow, for example, a teenager to borrow some money and a vehicle from a parent to go to the movies with a friend. The teenager would have an asset NFT for the vehicle and another asset NFT for the parent's payment portal. The payment portal NFT may include a smart contract dictating a credit limit of a predetermined dollar amount, or percentage of a current available balance within the payment portal, and may stipulate a period of time in which such funds are to remain available for use by the teenager. Arrangements such as the aforementioned example increase the speed and ease-of-use for various transactions between creditor and debtor agents.

In yet another example embodiment, the software application may be configured to provide asset NFTs for trust accounts and/or for business enterprises. Such an ability to form an NFT for trusts and businesses may enable beneficiaries and owners thereof to access all related permissions through the software application. Via the associated asset NFTs, the software application may account for trusts and businesses owned by a user within at least one computational value associated with the user, such as the aforementioned computational value representing the net worth of all of the user's assets registered by the software application.

Further, according to an example embodiment, ID NFTs and asset NFTs may be linked together with government—including, for example, military—data using an AI/ML algorithm or model. Such data linking and intelligent processing serves to facilitate accountability, asset management, and safety.

In other example embodiments, ID NFTs, computational aggregate values corresponding to electronic assets, computational aggregate scores corresponding to electronic assets, and asset NFTs may be linked together with enterprise human resources (HR) data using an AI/ML algorithm or model. Such data linking and intelligent processing serves to facilitate accountability, productivity, and asset management.

In still other embodiments, an IP marketplace system is disclosed. The IP marketplace may employ NFTs, e.g., asset NFTs, to support a marketplace for various IP assets, e.g., patents, copyrights, trademarks, NIL (name, image, likeness) assets, and trade secrets, etc. Examples of IP asset transactions enabled by the system include buying, selling, and licensing, etc. of IP assets. Licenses facilitated by the system may be exclusive or non-exclusive. Moreover, the system may utilize smart contracts as part of providing the IP asset marketplace. For example, when a patent is acquired, a smart contract may be configured to implement an assignment for the patent. Likewise, the smart contract may also be configured to record the assignment automatically at the assignments branch of the U.S. Patent and Trademark Office. The IP marketplace may include functionality to perform assignments of IP assets, e.g., patents, in a secure manner.

Additionally, the IP marketplace may support transferring ownership and/or controlling licensees of IP assets. The IP marketplace may be configured to as platform to assign, license, sell IP assets, such as patents, copyrights, and trademark assets. Such IP assets may be represented by NFT tokens available for purchase or auction at a set price or license fee. The IP NFT assets may be stored or traded via a crypto wallet in the IP marketplace. The IP NFT asset transactions and transfers can be recorded in a blockchain system and processed via the IP marketplace.

FIG. 1 is a flow diagram showing an example embodiment of a blockchain encoding system 100 that may operate in tandem with the disclosed software application. Using the blockchain encoding system 100, an asset owner can begin to securely control electronic assets by generating an ID NFT. Such an owner may be represented by an owner node coupled with the blockchain encoding system 100 and in communication with the software application. In response to a command received from the asset owner or owner node, the software application couples the ID NFT corresponding with the owner to the asset or a digital representation thereof. Any type of asset, whether physical, inherently digital, or otherwise, may be registered with the software application as a digital, e.g., digitally represented, or electronic asset. Such coupling may include generation of an asset NFT. Upon such coupling, the electronic asset may be imbued with permissions that depend upon tier levels of a user thereof, for security. The tier levels may reflect the four-tier paradigm introduced hereinabove. The permissions allow full control of the electronic asset through the owner node, and maintain accountability of the electronic asset at all times.

Using the blockchain encoding system 100, nodes can be identified to securely allow control of an electronic asset and manage associated permissions granted to a holder of an electronic asset. The holder of the electronic asset, e.g., a holding node, may be established as such upon assignment of their ID NFT to the electronic asset. Holding nodes may include the owner node, or other user nodes such as borrower nodes or renter nodes. These other user nodes, in a context reflecting the four-tier paradigm, may be authorized user nodes, claimant nodes, and proprietor nodes.

According to the embodiment, at 101, a node starts the software application for the blockchain encoding system 100. At 102, the blockchain encoding system 100 verifies the identity and security statuses pertaining to the node. At process 103, the blockchain encoding system 100 determines whether the identity of the node is valid, e.g., if identity verification resulted in success. If yes, at process 104(*a*), the blockchain encoding system 100 may allow access, which may include, e.g., loading the encoding system 100. Else, if no, at 104(*b*), the blockchain encoding system 100 may prompt the node to try again after a failed identity validation process 103. One or more retries may be permitted at 104(*b*) after each failed identity verification attempt. At process 148, the blockchain encoding system 100 continues to prompt the node for a predetermined number of iterations or retries that is greater than zero. At 148(*a*), the blockchain encoding system 100 decrements a number of remaining iterations or retries and prompts the node to try the validation process again at 102. Upon exhaustion of the iterations 148(*b*)1, e.g., when no tries remain, the blockchain encoding system 100 exits the software application 148(*b*)2.

At 105, the node communicates with other nodes. At 106, the node manages incoming requests made by other nodes. At 111, the node decides whether to accept the requests of other nodes. If no, at 112(*b*), the node may deny requests for communication from the other nodes. Else, if yes, at 112(*a*), the node may accept such requests and be prompted by the blockchain encoding system 100 to add and/or save a requesting node to a list that allows communications and future transactions with the requesting node. At 107, the node manages communications and/or contacts with nodes so approved for interaction. At 108, the node makes determinations based on trustworthiness of nodes with which it has previously interacted; such determinations may include, e.g., rating and/or ranking of nodes. At 109, the node sends communications and/or messages to other nodes. At 110, the node may send a request to other nodes, or add and/or delete nodes currently approved for transactions from the aforementioned list thereof.

At 113, the node manages electronic assets and tokens, e.g., asset and/or ID NFTs, associated therewith. At 114, the node views or accesses an indication of electronic assets that it currently holds, e.g., with respect to which electronic assets that the node is currently a holding node. At 115, a holding node that is an owner node imports, adds (e.g., mints), and/or selects electronic assets within the blockchain encoding system 100. At 116, the owner node creates new or selects existing security tier levels and assigns such levels to an electronic asset. At 117, the owner node assigns various permissions to an electronic asset based on each tier level. It should be noted that this assignment of permissions may grant access to the electronic asset, which may in turn be used to communicate with other devices, assets, etc. via an Internet of Things (IoT) implementation.

At 118, a holding node temporarily allows, grants, and/or transfers to other nodes possession and/or use of an asset NFT electronic asset, e.g., an electronic asset with an associated token, e.g., asset NFT, and assigns permissions and governs use by a smart contract for other nodes, for a set period of time. At process 119, the blockchain encoding system 100 verifies the identity of the holding node and of a receiving node. At 120, the holding node sets permissions for the receiving node for the duration of time the receiving node holds the electronic asset. At 121, the holding node creates or adds a smart contract that dictates terms between the node and the receiving node, tier level of the receiving node in the smart contract, and duration until expiration of the smart contract. At 122, the nodes involved, e.g., the holding node and the receiving node, make a decision whether to accept the terms in the smart contract. If no, at process 122(*b*), the blockchain encoding system 100 may reset, canceling aforementioned configurations and returning to an initial state, in response to the terms being declined or otherwise not accepted. Else, if yes, at process 122(*a*)1, the holding node may add or change the status of a token and/or the electronic asset in response to the terms of the smart contract being accepted. At process 122(*a*)2, the holding node may complete a transfer of the electronic asset to the receiving node.

At 123, the holding node may gain access to other electronic assets, permanently transfer or exchange electronic assets if also an owner node, or switch electronic assets with another node. At 124, the holding node may create, add, generate, or assess a smart contract to carry out an exchange. At 125, the owner node and the receiving node make a decision whether to accept or deny the terms of the smart contract. If no, at 125(*b*), the smart contract may be denied, and the blockchain encoding system 100 may reset. Else, if yes, at 125(*a*), the holding node and the receiving node may accept the terms of the smart contract and an electronic asset is transferred to the receiving node.

At 126, the holding node may check status indicators of its electronic assets and/or tokens. At 127, the holding node may select an asset NFT for assessment or viewing. At process 128, the holding node may make update(s), change(s), and/or modification(s) to a smart contract governing the selected asset NFT 127. At process 129, any update(s), change(s), and/or modification(s) made may be saved by the holding node to the smart contract; process 129 may also include, e.g., saving a status of electronic asset(s) and/or token(s). At process 130, the holding node may track a location of an asset NFT electronic asset and the ID NFT assigned to the electronic asset. It should be noted that such tracking 130 allows for constant accountability of electronic assets, in turn providing improved management and security of asset NFTs.

At 131, the owner node verifies ownership of currently held asset NFTs. At 132, the owner node documents proof of ownership. At process 133, the owner node sends documentation information 132 to the blockchain encoding system 100 for verification. It should be noted that AI/ML algorithms may be used to verify the authenticity of the owner node's documentation 132, at which point the owner node may be rewarded or punished by the blockchain encoding system 100 based on the results, thereby increasing trust in the system. Upon successful verification 133, the owner node is directed to process 129 at which point the owner node may save changes, including, e.g., status updates, made to the asset NFT. If verification 133 fails, at process 133(*a*), the system may prompt the owner node as to the failed verification and the blockchain encoding system 100 may reset.

At 134, the holding node may select, view, and/or assess an ID NFT that is connected to it. At 135, the holding node may select, view, and/or assess the electronic asset(s) to which the ID NFT is currently assigned or coupled.

At 136, the holding node may choose to reclaim or restrict an electronic asset based on a violation of a smart contract or a term thereof, or otherwise exercise its right based on tier level permissions and terms of the smart contract. At process 137, the blockchain encoding system 100 determines whether the holding node is authorized to reclaim the electronic asset. It should be noted that ML/AI algorithms may be used to determine such authorization. If authorization 137 is not granted, then, at 137(*b*)1, the holding node may be prompted to reassess smart contract terms in response to authorization 137 being denied. Further, at 137(*b*)2, the holding node may request to dispute any terms and/or violations of the smart contract. Else, if authorization 137 is granted, then, at 137(*a*), the holding node reclaims the electronic asset.

At 138, the holding node may export token(s) and/or an asset NFT electronic asset to a new metaverse environment, digital domain, or other online environment.

At 139, the holding node assesses a status associated with the ID NFT to which it is tied. At 140, the holding node assesses an aggregate computational value of a plurality of the electronic assets tied to the ID NFT with which the holding node is associated. At 141, the holding node updates the status(es) and value(s) of the electronic asset(s) tied to the ID NFT with which the node is associated. It should be noted that the system may use ML/AI algorithms to determine the aggregate computational value of the plurality of the electronic assets tied to the ID NFT with which the node is associated, and/or a measure of accuracy of the suggested computational value(s) provided by the node. At 142, the node assesses an aggregate score of the ID NFT associated with the node, e.g., to evaluate a level of trustworthiness, and apply said level of trustworthiness to the ID NFT, via a scoring engine, e.g., the scoring engine 200 described hereinbelow with respect to FIG. 2. It should be noted that the scoring engine may use ML/AI algorithms to predict an aggregate score based on prior transactions with other nodes and patterns of behavior associated with risky behaviors or activities in the blockchain transactions associated with the holding node by evaluating unstructured data.

Continuing with FIG. 1, at process 143, the blockchain encoding system 100 assesses data collected via the software application through actions made on the system or across WEB3 or other online environments that may include features such as decentralization and blockchain functionality. It should be noted that ML/AI algorithms may be used to come to possible conclusions determined by unstructured data. At process 144, the holding node manages this collected data 143. At process 145, the holding node views or assesses how this data 143 is being used. At process 146, the holding node may share or transfer data via a smart contract. It should be noted that the holding node may allow third parties access to data 143 through this transfer feature 146. At process 147, the holding node may restrict access to or delete collected data 143.

Figure 2:
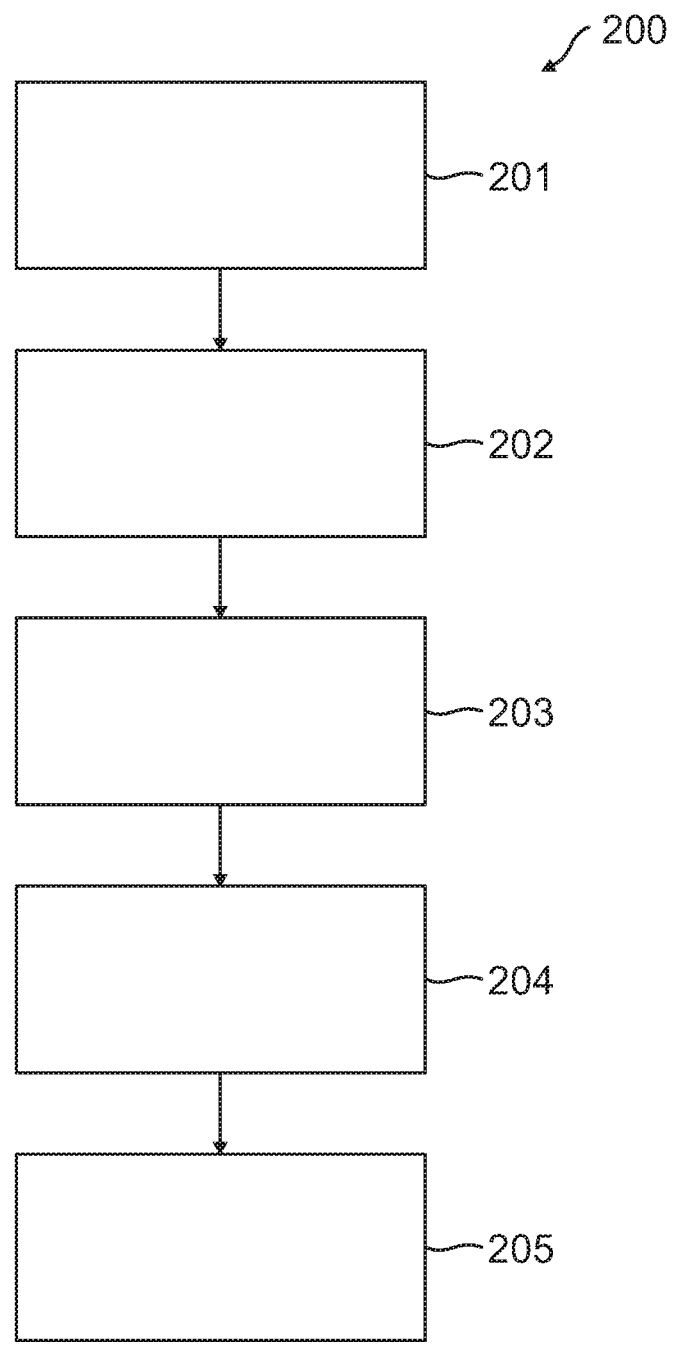
FIG. 2 is a flow diagram of a scoring engine of an encoding system according to an example embodiment.

FIG. 2 is a flow diagram showing an example embodiment of the scoring engine 200. Using the scoring engine 200, nodes can be configured to computationally track an aggregate value of electronic assets by tokenizing all assets, and deriving computationally projected risk levels from holds or pledges against those electronic assets. At process 201, the scoring engine 200 assesses a subject node's respective security status. At 202, the scoring engine 200 assesses a level of permissions/access afforded to the subject node and trustworthiness thereof. At 203, the scoring engine 200 processes search results from WEB3 blockchain transactions associated with the subject node. The scoring engine 200 can assess a risk level associated with the WEB3 blockchain transactions. In an example, the scoring engine 200 may interface with ML and/or AI algorithms to evaluate unstructured data about risky behaviors or activities in the blockchain transactions associated with the subject node. For instance, the ML/AI algorithms can identify patterns of behavior related to past incidents and transpose them as risk predictors. These patterns of behavior can be used to generate a model using the ML/AI algorithms that can be built based on the blockchain transaction data, and used as training data, in order to make the model.

In this way, at 204, a node can track a projected aggregate trustworthiness/security value through the scoring engine 200. At 205, the scoring engine 200 makes or suggests electronic asset recommendations to other nodes on behalf of the subject node based on the projected aggregate value. Further, at 205, third party systems off-chain or on systems on another blockchain network could also use this aggregate score to assess the level of trustworthiness of the subject node. In this way, third party systems can use the aggregate trustworthiness/security value to computationally project whether the subject node is an untrusted source. This projection has potential for widespread scalability with other DeFi applications.

Figure 3:
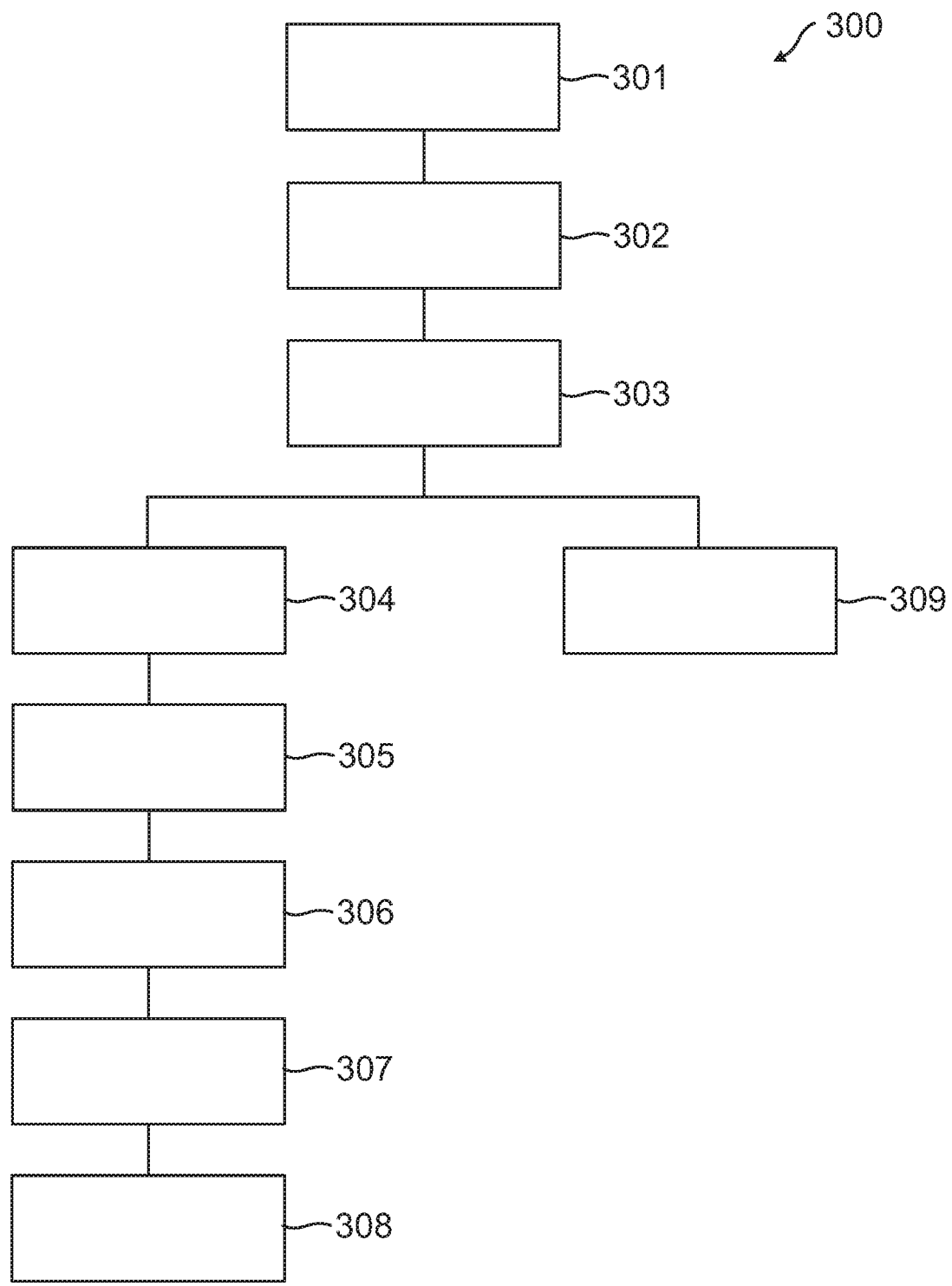
FIG. 3 is a diagram of an example tier system implemented to manage permissions of nodes associated with an example embodiment.

FIG. 3 is a diagram showing an example tier system 300 utilized in the blockchain encoding system 100 (FIG. 1) to ensure maximum control and security of electronic assets connected with an ID NFT that is associated with a node. At 301, the dedicated server is depicted. At 302, a database in which the tier levels are stored is shown. It should be noted that the data displayed in database 302 may be stored on a blockchain for maximum security and control. At 303, a server-side application that communicates with the database is shown. At 304, a client-side of a holding or token owner node is shown. At 305 through 308, the tier hierarchy in which permissions are attached is shown. At 309, a client-side of a receiving node is shown. The client-side 309 of the receiving node may be subject to the same tier hierarchy illustrated in context of the holding node.

To continue with respect to FIG. 3, at 305, tier 1, the highest access level, e.g., owner access, is granted. Tier 1 occupants have all rights to access, use, create, exclude others, manage, exchange, and transfer ownership of the electronic asset and/or associated asset NFT and are considered administration. At 306, tier 2, e.g., proprietor, access is shown. Tier 2 occupants have all rights of owner excluding the right to sell, trade, or transfer ownership of electronic asset(s). At 307, tier 3, e.g., claimant, access is shown. Tier 3 occupants have full access to assigned electronic assets/tokens and rights to refuse or deny access to occupants of lower, e.g., higher numbered, tiers. At 308, tier 4, e.g., authorized user, access is shown. Tier 4 occupants have the most limited rights. Tier 4 occupants may only access/use electronic assets assigned to them.

Figure 4:
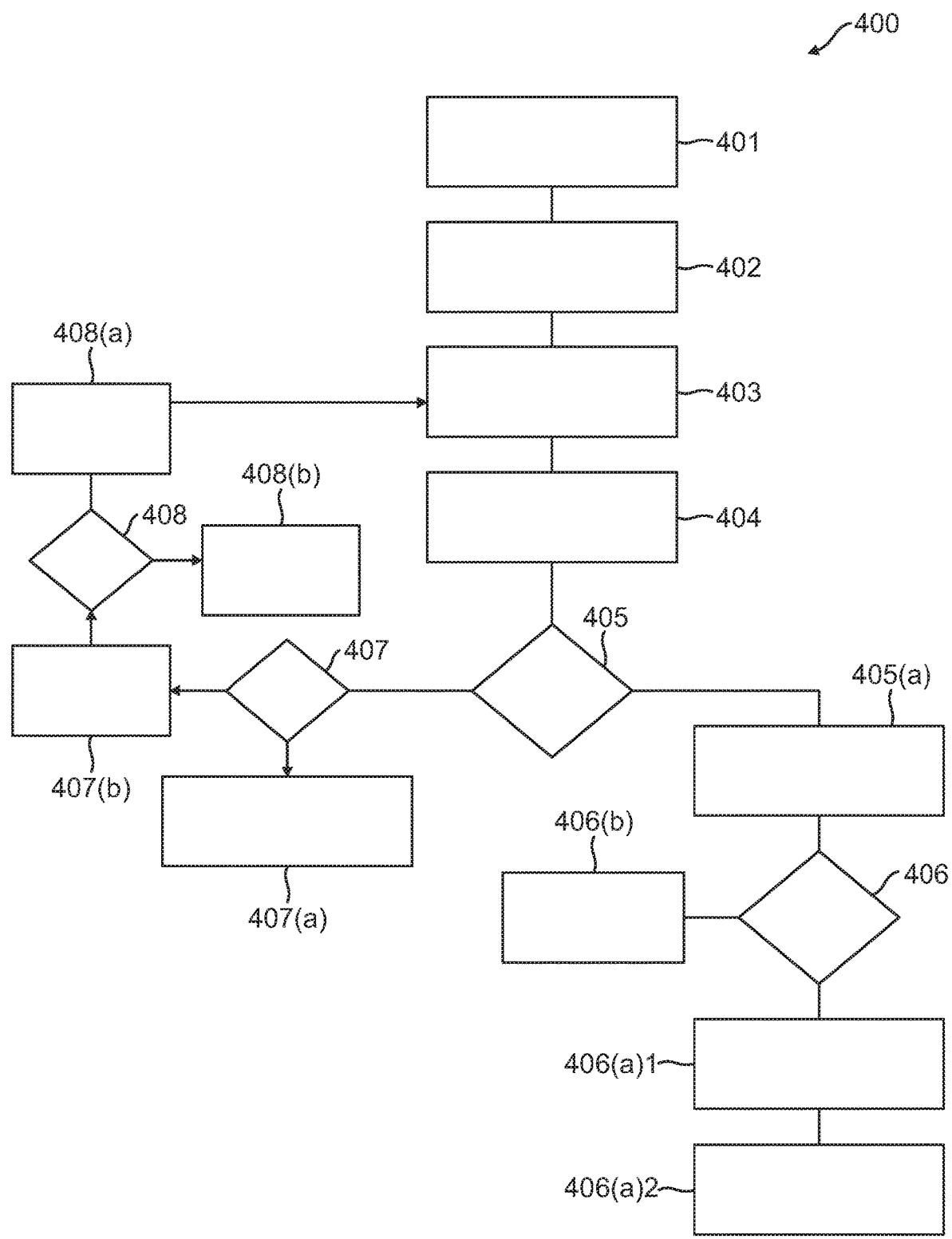
FIG. 4 is a flow diagram of an example method of creating and registering an identity non-fungible token (ID NFT) according to an embodiment.

FIG. 4 is a flow diagram showing an example embodiment of processes 400 relating to the creation and registration of an ID NFT. At 401, a node assesses the application provider, which allows access to the blockchain encoding system 100 (FIG. 1). At process 402, the node makes a request to download the disclosed software application, which is configured to facilitate transmission of data between the database 302 (FIG. 3) and the node. At 403, the node supplies unique identifying information. At 404, the node requests access to the blockchain encoding system 100, e.g., by requesting to register and/or connect to system 100.

To continue, at process 405, the blockchain encoding system 100 determines whether the information supplied exists within the database 302. Process 405 may include determining whether a user exists who corresponds to the supplied identifying information. At process 405(a), the system may determine there is no existing match, and prompt the node to create an account and/or unique identifier by supplying multiple forms of identification. It should be noted that a legal entity or autonomous device may qualify for the equivalent of a unique ID NFT by providing information such as Articles of Incorporation, Biometrics of Director, etc. At 406, the blockchain encoding system 100 verifies and ties or associates the ID NFTs in the database 302. If verification 406 is unsuccessful, then, at 406(b), the blockchain encoding system 100 may reset in response to failing process 406. Else, if verification 406 succeeds, then, at 406(a)1, the blockchain encoding system 100 may create or mint a unique ID NFT to which electronic assets can be assigned. Such creation 406(a)1 may occur in response to the blockchain encoding system 100 successfully verifying and linking the IDs together in process 406. It should be noted that an AI-powered identity verification system (such as an oracle system) may be used to leverage machine learning algorithms and computer vision techniques to verify the authenticity of the data supplied by the node in real-time. For example, access control policy verification may be integrated into the oracle) to ensure that there are no faults within verifying and linking process. Further, at 406(a)2, the node may load and access the ID NFT. Process 406(a)2 may also or alternatively include performing a system load operation.

Further with respect to FIG. 4, after successfully confirming at process 405 that the information supplied matches an existing unique identifier and corresponding ID NFT on the database 302, the blockchain encoding system 100 determines whether the information supplied is correct at 407. At 407(a), the blockchain encoding system 100 grants the node access to the corresponding ID NFT in response to successfully determining 407 that the information supplied is correct, and the node may thus load and access the ID NFT. Process 407(a) may also or alternately include performing a system load operation. At 407(b), the blockchain encoding system 100 denies access to the ID NFT in response to a failure situation where the blockchain encoding system 100 determines 407 that the information supplied is not correct. It should be noted that the blockchain encoding system 100 may flag and alert the owner of the ID NFT at this point. Process 407(a) may also or alternately include providing one or more retries for verifying the information. At 408, the blockchain encoding system 100 determines whether any verification retries or attempts remain, e.g., whether the number of retries left is greater than zero. At 408(b), the blockchain encoding system 100 activates system security protocol in response to determining that no verification attempts remain, e.g., when the number of tries remaining is zero. At 408(a), the blockchain encoding system 100 decrements a number of remaining attempts or retries and prompts the node to try the verification procedure again.

Figure 5:
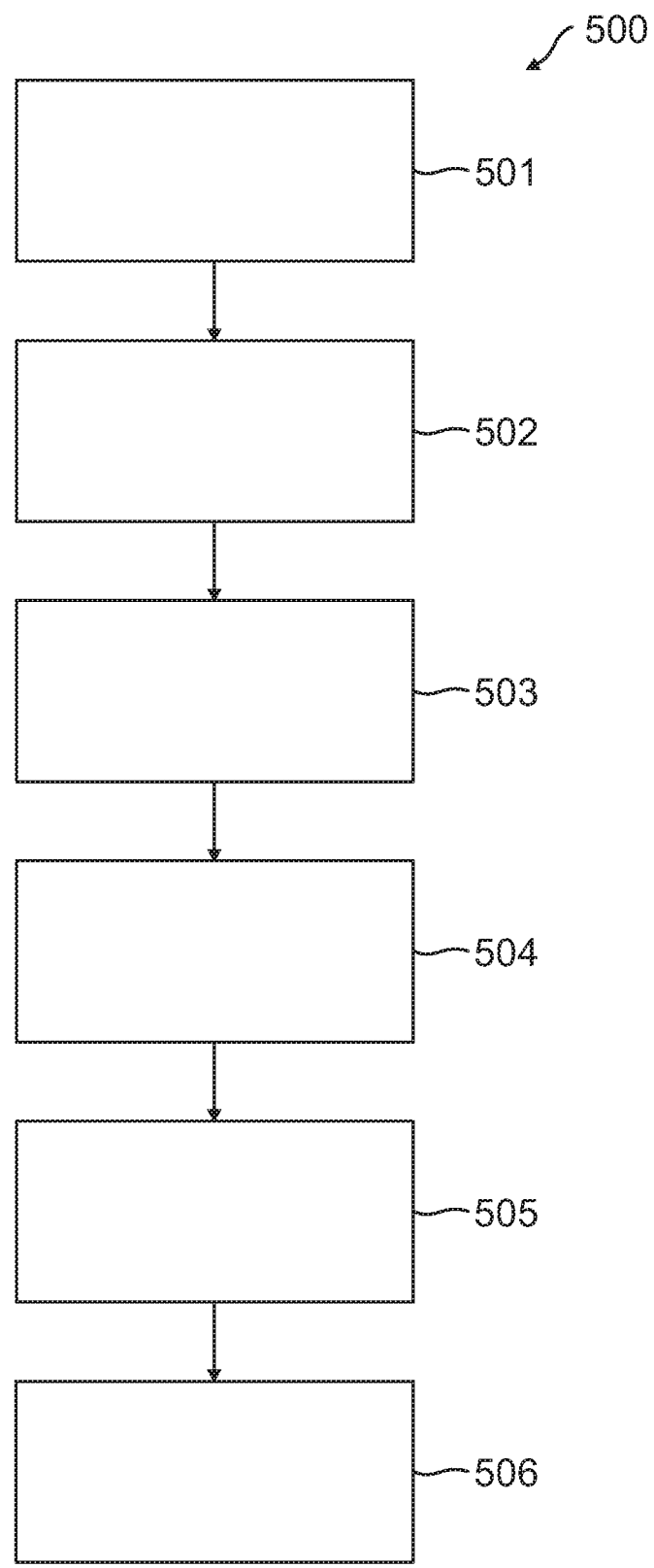
FIG. 5 is a flow diagram of an example scenario in which the blockchain encoding system of FIG. 1 may be used to control assets, according to embodiments.

FIG. 5 is a flow diagram depicting an example scenario 500 in which the blockchain encoding system 100 (FIG. 1) may be used to control assets accessed by a node with tier 4 access. In the scenario 500, a house or smart home may be equipped 501 with a smart lock featuring communication capability through the Internet of Things (IoT). An owner node in the scenario 500 has set the blockchain encoding system 100 to allow access to the house through the smart lock by verifying a unique ID NFT. A process for which this permission has been granted, e.g., walking a dog around the neighborhood, typically takes 25 minutes. A hypothetical robotic dog walker, referred to herein as RoboWalker 2.0, representing a receiving node, typically shows up between 2:02 pm-2:20 pm and drops the dog back off between 2:25 pm-2:50 pm. The blockchain encoding system 100 has been configured, through permissions granted, to grant or allow tier 4 access of the house to RoboWalker 2.0 from 2:00 pm-3:00 pm at 502, to give a reasonable time buffer in case of delays, without requiring the robot to send another request for access. The blockchain encoding system 100 has been configured to allow RoboWalker 2.0 tier 4 access at this time period Monday through Friday.

To continue, at 502, a chart shows that the blockchain encoding system 100 has been configured (at 2:00 pm) to grant or allow tier 4 access to RoboWalker 2.0 through a unique ID NFT produced by the node associated with RoboWalker 2.0. At 503, RoboWalker 2.0 arrives at 2:05 pm equipped with the unique ID NFT. The owner node communicates with the smart lock and access is granted based on the ID NFT being recognized, at which point the smart lock is disengaged. At 504, RoboWalker 2.0 departs the house and the lock reengages, and the robot proceeds to take the dog out and around the neighborhood. At 505, RoboWalker 2.0 arrives back to the house at 2:30 pm with the unique ID NFT, at which point the lock again disengages based on the ID NFT being recognized. RoboWalker 2.0 returns the dog, access is rescinded, and the smart lock is then reengaged. 505 may also include an expression of gratitude: "Thanks RoboWalker 2.0." At 506, the smart contract expires.

Figure 6:
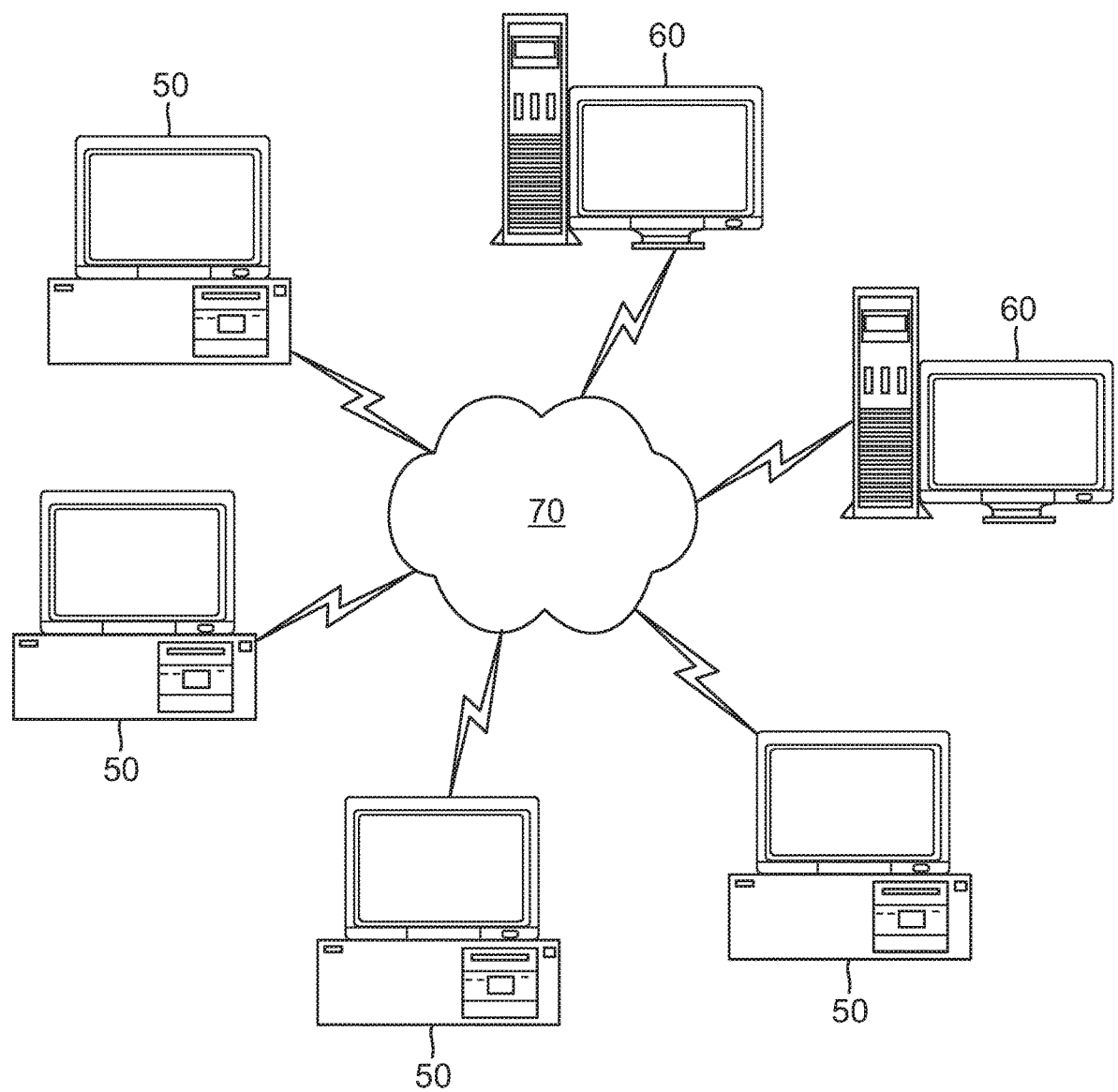
FIG. 6 illustrates a computer network or similar digital processing environment in which embodiments may be implemented.

FIG. 6 illustrates a computer network or similar digital processing environment or system in which embodiments of the present disclosure may be implemented. Computing node(s)/device(s) 50, e.g., client computer(s)/device(s), and 60, e.g. server computer(s)/device(s), provide processing, storage, and input/output (I/O) devices executing application programs and the like. Computing node(s)/device(s) 50 can also be linked through communications network 70 to other computing devices, including other computing node(s)/device(s) 50 and/or 60. Communications network 70 can be part of a remote access network, a global network (e.g., the Internet), a worldwide collection of computers, local or wide area networks, and gateways that currently use respective protocols (TCP/IP, Bluetooth®, etc.) to communicate with one another. Other electronic or computing node/device network architectures are suitable.

Computing node(s)/device(s) 50 and/or 60 may be configured, alone or in combination, to implement the embodiments described herein, e.g., methods 900, 1000, 1100, 1200, and/or 1300, among other examples. Computing node(s)/device(s) 60 may not be separate server computers but part of communications network 70.

Figure 7:
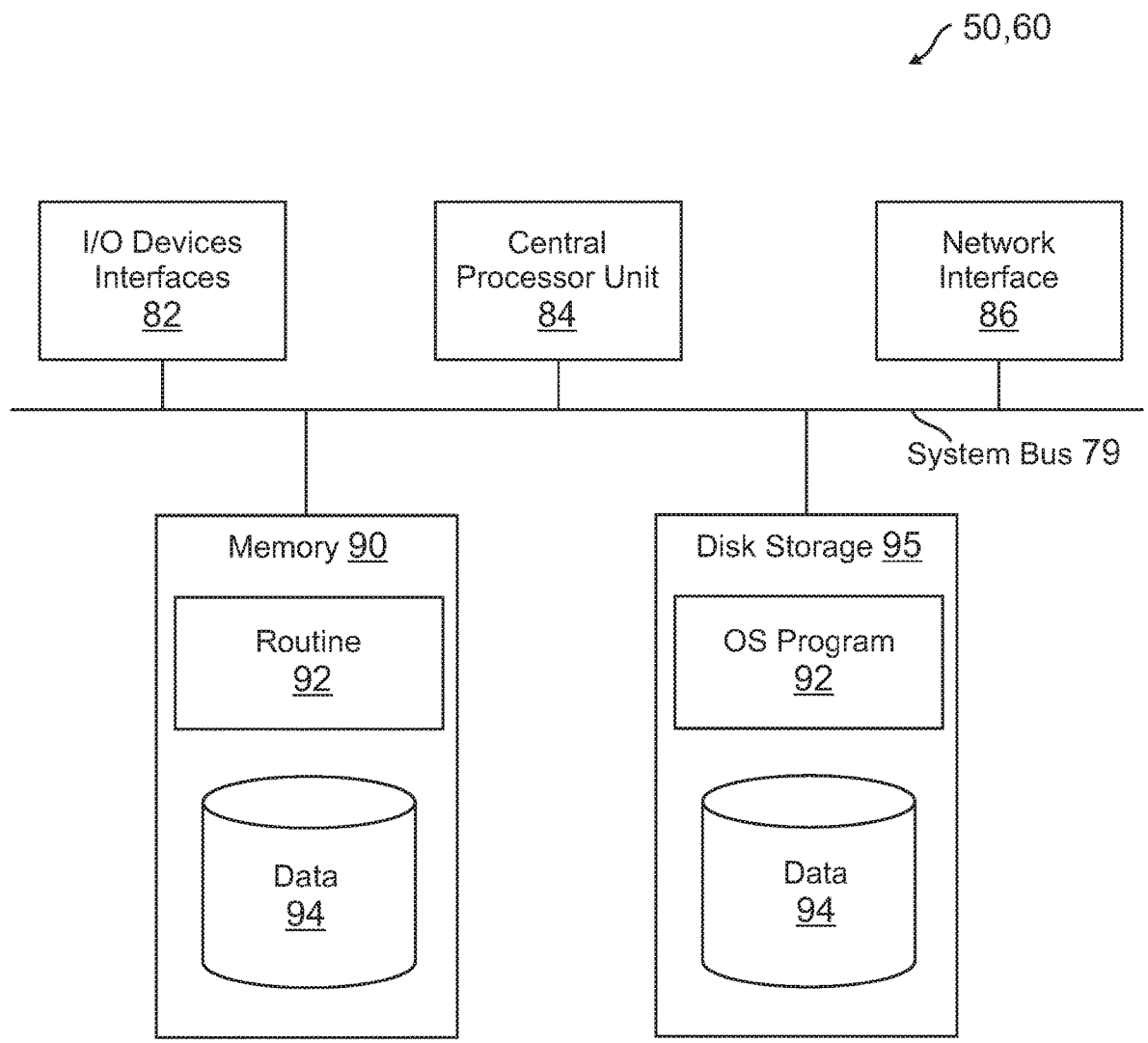
FIG. 7 is a diagram illustrating an example internal structure of a computer in the environment of FIG. 6.
Figure 16:
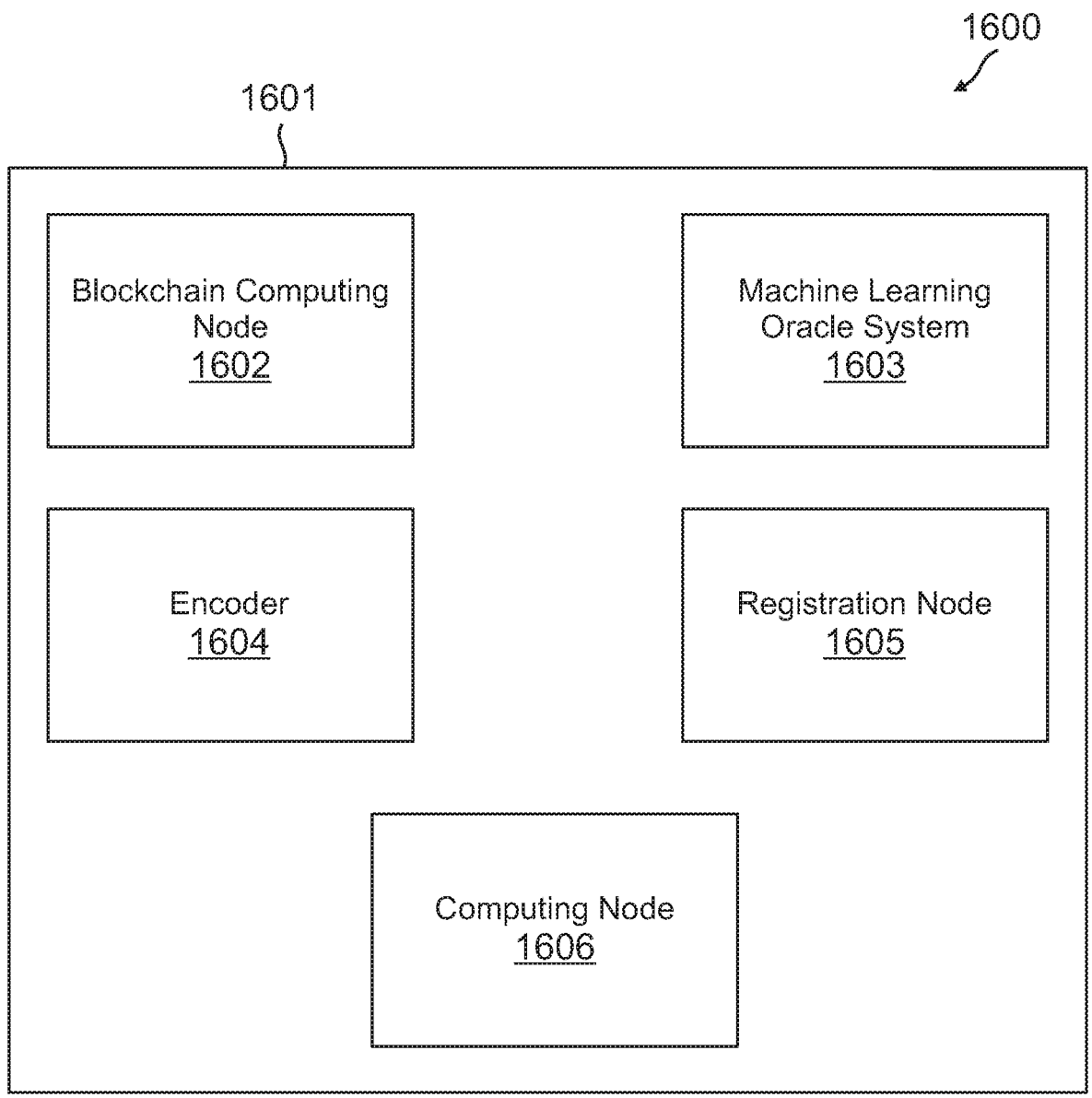
FIG. 16 is a simplified block diagram of an exemplary computer-based system for securely controlling an electronic asset according to an embodiment.

FIG. 7 is a diagram of an example internal structure of a computing node/device, e.g., computing node(s)/device(s) 50 and/or 60 (FIG. 6) or node 1602, ML oracle 1603, encoder 1604, node 1605, and/or node 1606 (FIG. 16). Each computing node/device contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) and enables the transfer of information between the elements. Attached to the system bus 79 is an I/O device interface 82 for connecting various input and output devices (e.g., keyboard, mouse, displays, printers, speakers, etc.) to the computing node/device. A network interface 86 allows the computing node/device to connect to various other devices attached to a network (e.g., communications network 70 of FIG. 6). Memory 90 provides volatile storage for computer software instructions 92 and data 94 used to implement an embodiment of the present disclosure (e.g., methods 900, 1000, 1100, 1200, and/or 1300, among others). Disk storage 95 provides non-volatile storage for computer software instructions 92 and data 94 used to implement an embodiment of the present disclosure. A central processor unit (CPU) 84 is also attached to the system bus 79 and provides for the execution of computer instructions.

Figure 8:
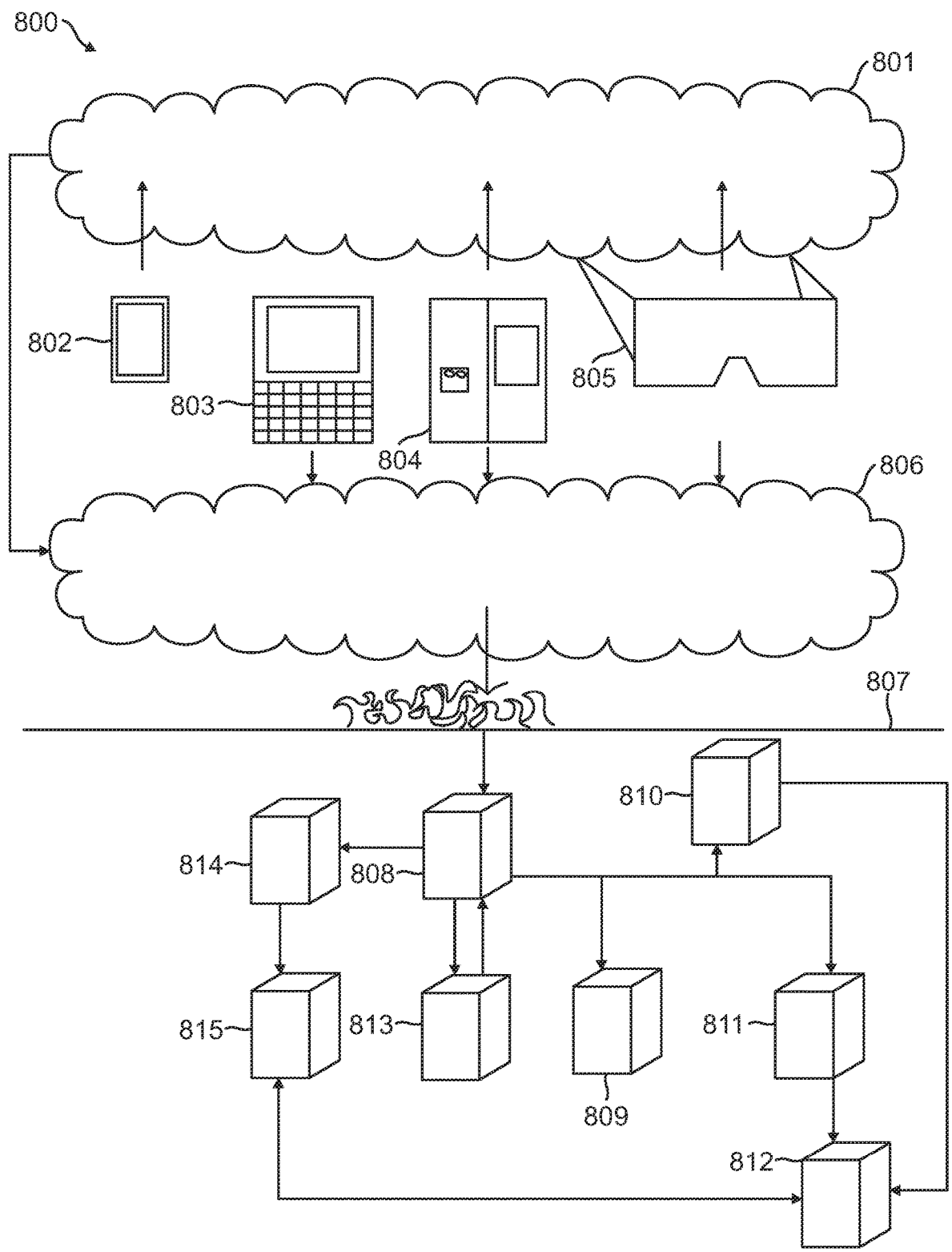
FIG. 8 is a simplified block diagram of an exemplary client/server infrastructure system according to an embodiment.

FIG. 8 is a simplified block diagram of an exemplary client/server infrastructure system 800 according to an embodiment. In an embodiment, system 800 may be, e.g., a Blockchain Encoding System (BES).

Exemplary servers illustrated in FIG. 8 may be virtual servers or may be distributed through, e.g., system 1400, described hereinbelow with respect to FIG. 14; system 1400 may be e.g., a Blockchain-Integrated Redundant Distributed System (BIRDS). In an embodiment, system 1400 may use nodes' storage space and computing cycles to store digital assets and process node transactions using a blockchain and/or proprietary code, respectively. According to one such embodiment, data may be encrypted via, e.g., quantum resistant algorithms and individual nodes may lack an ability to tamper with or even view digital assets or transaction data. In an example embodiment, nodes may be rewarded based on, e.g., a complex algorithm that considers one or more factors including, but not limited to, reliability, availability, dedicated storage space, CPU cycles, computational aggregate value, and/or aggregate score, etc.

As shown in FIG. 8, system 800 may include first cloud 801, portable Internet Protocol (IP) device 802, fixed IP device 803, IoT device 804, other IP device 805, second cloud 806, firewall 807, authentication server 808, market application server 809, asset database server 810, other application(s) 811, asset NFT server 812, user database server 813, user setup server 814, and ID NFT database server 815. First cloud 801 may include one or more forms of wireless connectivity including, but not limited to, Wi-Fi, Bluetooth, or any other wireless connection known to those in the art. One or more known standards, networking technologies, and/or protocols may operate within first cloud 801; examples include smart-home standards, such as Matter, or networking technologies, such as Thread. Portable IP device 802 may include, e.g., a smartphone, tablet, laptop computer, smart watch, and/or other portable device known in the art. Fixed IP device 803 may be a device, such as a desktop computer, or any other known device. IoT device 804 may be any IoT device, such as a smart lock, smart thermostat, smart light, smart refrigerator, smart parking meter, and/or other IoT device known to those in the art. Other IP device 805 may include one or more other types of IP devices, such as VR/augmented reality (AR) goggles/glasses, haptic suits/gear, and/or other known IP devices. Second cloud 806 may include, e.g., the internet; devices, such as IoT device 804 and/or other IP device 805, that may utilize wireless connectivity via first cloud 801, may also or alternatively connect via second cloud 806 in addition to devices with a fixed connection, such as fixed IP device 803. Authentication server 808 may authenticate or verify users and may serve as an entry point to system 800. Further, authentication server 808 may perform authentication or verification for both existing users and new users. When a user attempts to log on to system 800, authentication server 808 may authenticate or verify the attempt via user database server 813, as shown in FIG. 8. If user database server 813 determines that a user exists, the user may be permitted to log on; otherwise, e.g., in the case of a new user, authentication server 808 may communicate with user setup server 814 to perform a setup process for a new user. Market application server 809 may host a marketplace as described in more detail hereinbelow with respect to FIG. 12. Asset database server 810 may keep track of assets that are being stored via or interacting with system 800. Further, asset database server 810 may contain relevant information about one or more minted NFTs. Asset database server 810 may also, or alternately, communicate with asset NFT server 812. Other application(s) 811 may include one or more known application(s), such as an import application(s), translation application(s), configuration application(s), and/or smart contract application(s), etc. Asset NFT server 812 may keep track of NFTs being stored via or interacting with system 800. Further, as shown in FIG. 8, asset NFT server 812 may communicate with asset database server 810 and/or ID NFT database server 815. Details of an exemplary asset database server 810, other application server(s) 811, and asset NFT server 812 are described hereinbelow with respect to FIGS. 9A-B. ID NFT database server 815 may store relevant information that makes up an ID NFT; relevant information may include, for example, identification documents or biometrics, etc. ID NFT database server 815 may communicate with asset NFT server 812 to couple and assign one or more asset NFTs to one or more appropriate ID NFTs and track them for constant accountability. Details of an exemplary user setup server 814 and ID NFT database server 815 are described hereinbelow with respect to FIG. 13.

Figure 9A:
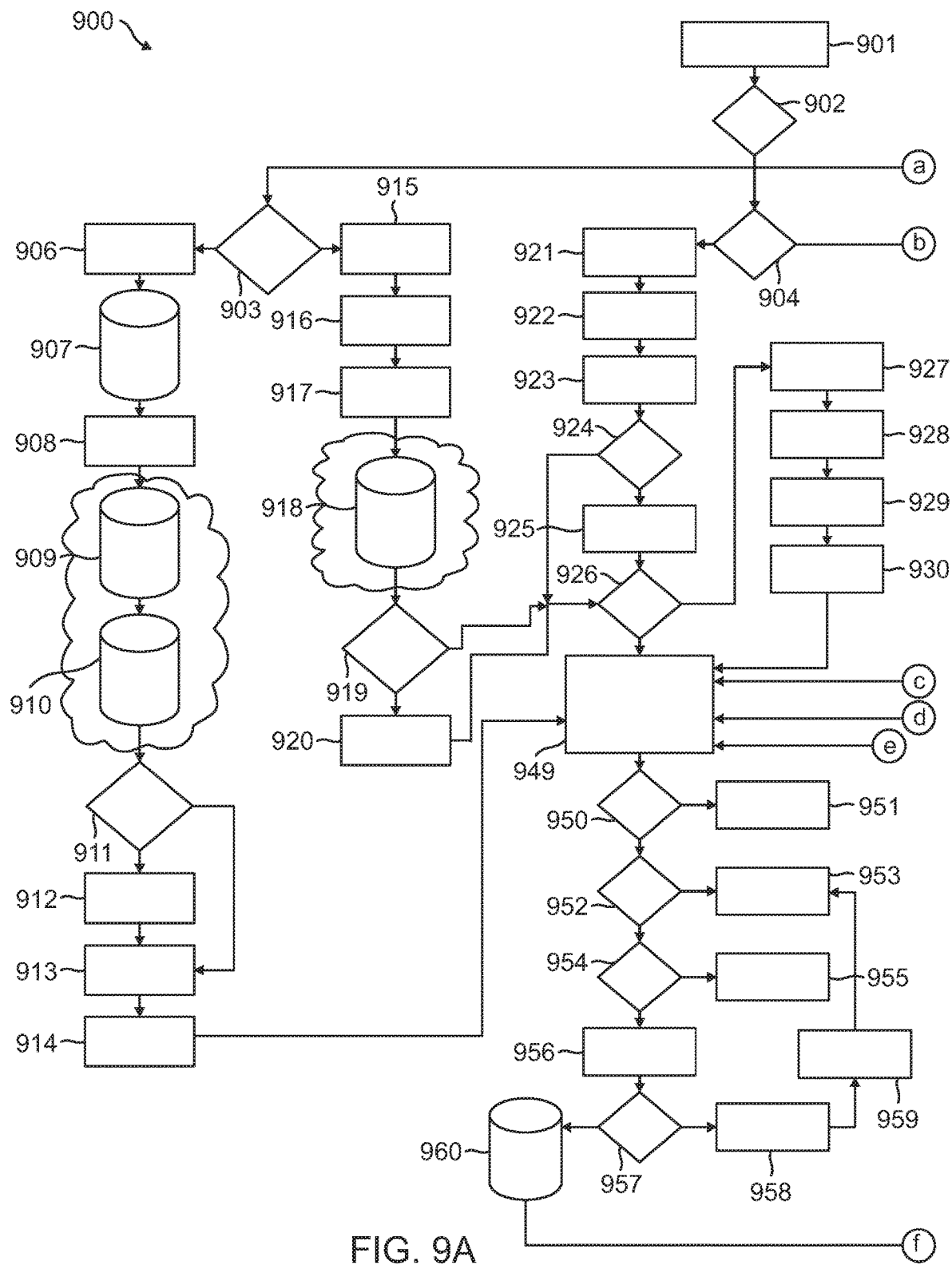
FIGS. 9A-B illustrate a flow diagram of a method according to an embodiment.
Figure 9B:
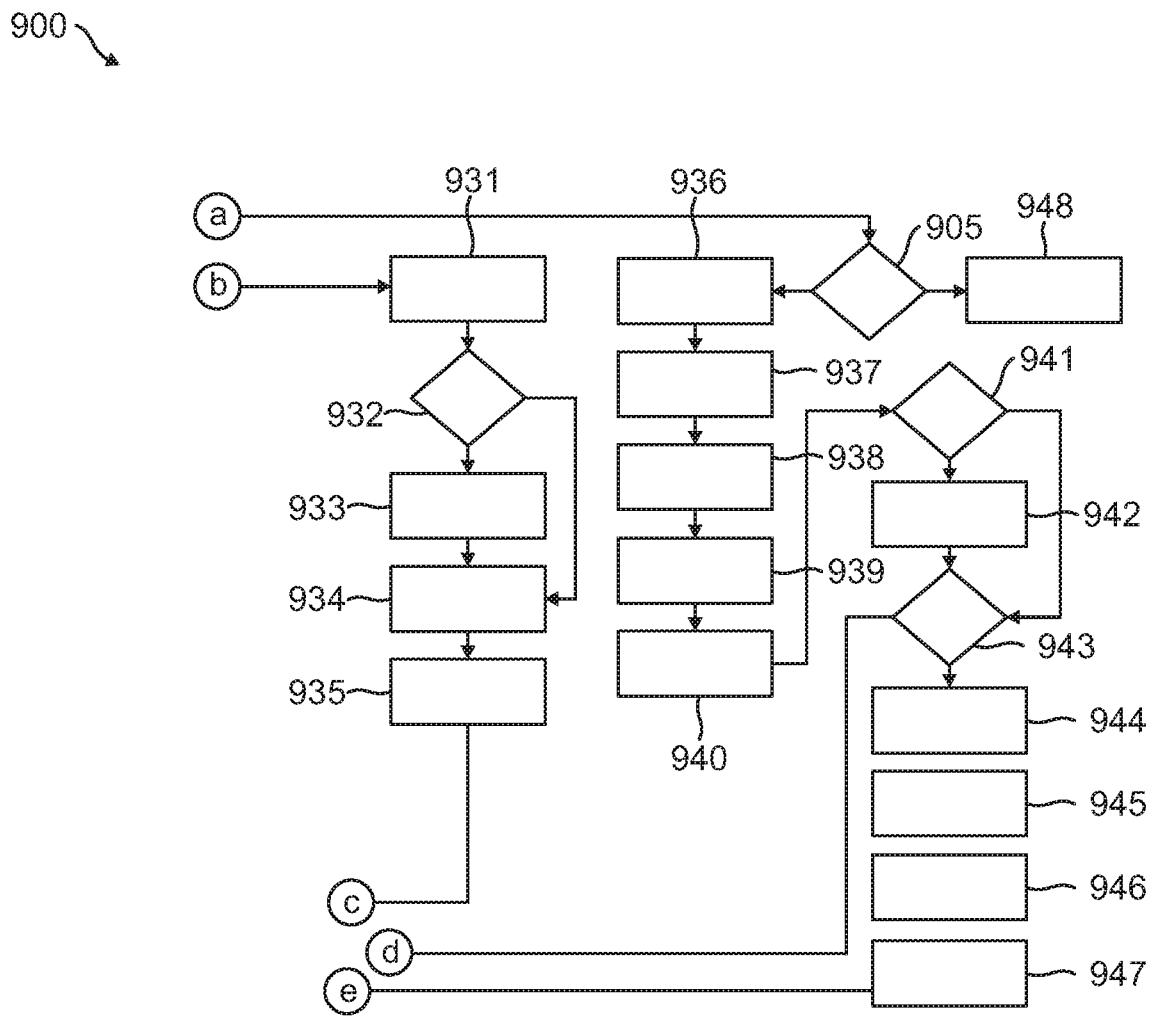
Figure 9B:
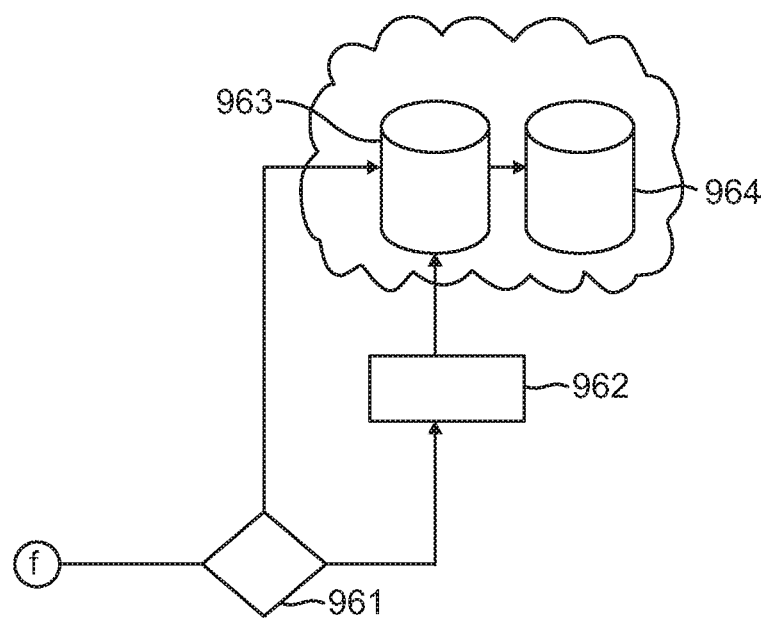

FIGS. 9A-B illustrate a flow diagram of a method 900 according to an embodiment. In one such embodiment, method 900 may include steps for importing assets, creating asset NFTs, configuring permissions, creating smart contracts, linking asset NFTs, and one-party transactions. Importation may involve one or more types of assets (e.g., metaverse, digital, and physical). Further, permissions configured may include foundational permissions. Asset NFTs may be linked with, e.g., translation code, such as Generic Universal Translation (GUT) code. Moreover, one-party transactions may be a special sub-category of transactions that may include moving objects into another online environment or digital domain such as a new metaverse environment. The definition of one-party transactions for purposes of FIGS. 9A-B is transactions that do not involve a marketplace. Multiple-party transactions are described in further detail hereinbelow with respect to FIG. 11.

At step 901, a node (not shown) may request to import an item into, e.g., system 800 (described hereinabove with respect to FIG. 8), which may be a BES (not shown). At step 902, the system may determine what type of asset is being put into the system. At this point, the system may determine whether the item is, for example, a metaverse object, a non-metaverse digital object, or a physical object.

Steps 903-920 include operations for taking an object out of its original environment. In later steps, after the asset is configured and a smart contract is agreed upon, the asset may be transferred to another environment or back to the original environment (steps 945-946).

At step 903, the system may determine that the item being imported is a metaverse object and may determine whether an NFT currently exists for the object. If no, the system may proceed to process 906. If yes, the system may proceed to step 915, which is described further below. At step 906, the system may send a metaverse environment request to a supported metaverse database (not shown). At step 907, the system may check a supported metaverse server list database (not shown). The database may contain supported metaverse environments as well as supported digital items within metaverse environments. At step 908, the node may send a specific asset request for the specific item in the specific metaverse environment. At step 909, one or more metaverse environment system(s) (not shown) may consult or query a user database (not shown) of "metaverse environment one." This operation may authenticate or verify ownership of the metaverse object. At step 910, the one or more metaverse environment system(s) may retrieve the metaverse object from an asset database (not shown) (where information for a digital item is at) of "metaverse environment one." At step 911, the system may determine if a translation of the digital item is necessary. Note that certain metaverse environments may require translations to be done immediately or at time of importation. If the system determines a translation of the digital item is necessary, translation may be performed at step 912. If no translation is required, the system may proceed to step 913. At step 912, the system may translate the item into, e.g., GUT code. Using smart contracts, translation code such as GUT code may allow digital items without permissions from another source to be translated into the system and permissions to be added. In this way, a digital asset can also be translated for use from one metaverse environment into another, including between different game engines. This feature allows for maximum use and interoperability between different metaverse environments. AI/ML algorithms may assist in the translation process. At step 913, a new asset NFT may be minted for the metaverse object using, e.g., a hash of the digital item or asset (as an optional feature, it may also use the hash of the ID NFT of the corresponding node). At step 914, the system may store the digital asset on a BIRDS until it is needed in another digital environment.

At step 915, the system may determine that an NFT currently exists that represents the metaverse object and may authenticate or verify the NFT via a blockchain. At step 916, the system may obtain the NFT from, e.g., a metaverse environment, blockchain, wallet, or other source known in the art. At step 917, the system may collect metaverse environment data about the NFT item, for example, by using the NFT as a key to obtain the information. At step 918, the system may retrieve any relevant information from the asset database in "metaverse environment one." At step 919 (similar to step 911) the system may determine whether a translation is necessary. If yes, then, at step 920 (similar to step 912) the system may translate the item into, e.g., GUT code, and may proceed to step 926, which will be described below. If no, the system may instead proceed directly to step 926.

Steps 921-935 include operations for importing digital items that are not being imported from a metaverse environment.

At step 904, the system may determine that an asset is a digital non-metaverse asset and may determine whether there is an existing NFT that represents the digital asset. If yes, the system may proceed to step 921. If no, the system may proceed to step 931. At step 921, the system may determine that an NFT is currently associated with the digital object and may authenticate or verify the NFT via a blockchain. At step 922, the system may obtain the NFT from a blockchain, off-chain, a wallet, or other source known to those in the art. At step 923, the system may obtain or gather data about the digital asset from an appropriate source. At step 924, the system may determine whether translation into, e.g., GUT code is necessary. If no, the system may proceed to step 926. If yes, the system may proceed to step 925 and translate the code from the original environment into, e.g., GUT code. At step 926, the system may prompt the node as to whether or not it would like to burn or destroy the NFT and create a new NFT. Note that this feature may not be allowed depending on the smart contract the NFT is bound to. If burning the NFT and creating a new NFT is not requested, the system may proceed to step 949, which will be explained in further detail below. Otherwise, the system may proceed to step 927, which will be described below.

At step 927, the system will record the "burning" facts. These may include all original transactions involving the NFT, data attached to the NFT, or any other relevant information. At step 928, the system may burn the NFT. Note that this feature may allow NFTs to be updated to new standards as they are available while maintaining the integrity of the asset by never having more than one NFT representing the item at one time. At step 929, the system may re-mint the new NFT for the object using, e.g., a hash of the digital asset (similar to step 913). At step 930, the system may store the digital asset in a BIRDS.

Transitioning to FIG. 9B, at step 931, the system may authenticate or verify the digital item for ownership, authenticity, and/or legality using, e.g., AI/ML algorithms. At step 932, the system may determine whether to translate the digital item into, e.g., GUT code. If no, the system may proceed to step 934. Else, if yes, the system may proceed to step 933. At step 933, the system may translate the item into, e.g., GUT code. At step 934, the system may mint the NFT using, e.g., a hash of the digital asset (as an optional feature, it may also use a hash of an ID NFT of a corresponding node). At step 935, the system may store the digital asset in a BIRDS. This is where an asset enters, e.g., system 800. The system may then proceed to step 949, which will be described below.

Continuing with FIG. 9B, steps 936-948 may include operations for importing digital items that represent real-world physical items.

At step 905 of FIG. 9B, the system may determine that the item is a physical object and may determine whether an NFT currently exists for the item. If not, the system may proceed to step 948 (described hereinbelow with respect to method 1000 of FIG. 10). If so, the system may proceed to step 936. At step 936, the system may verify the NFT via a blockchain. At step 937, the system may obtain the NFT from a blockchain, off-chain, a wallet, or another source known in the art. At step 938, the system may obtain or gather data about the physical asset from an appropriate source. At step 939, the system may determine whether the physical object or item is authentic. At step 940, the system may verify that the NFT is linked to the item. Steps 939-940 may include, for example, using AI/ML to make these determinations. At step 941, the system may determine whether to translate the item into, e.g., GUT code. If no, the system may proceed to 943. If yes, the system may proceed to step 942. At step 942, the system may translate the item into, e.g., GUT code (an example of when this may be necessary is if a physical object has a corresponding digital/metaverse object associated with it). At step 943, the node may determine whether to burn the original NFT. If no, the system may proceed to step 949, which is described below. If yes, the system may proceed to step 944.

At step 944, the system may record the "burning" facts (similar to step 927). At step 945, the system may burn the item. At step 946, the system may re-mint the new NFT for the object. At step 947, the system may store the digital asset that is associated with the physical object in a BIRDS. The system may then proceed to step 949, which is described below.

Steps 949-964 of FIGS. 9A-B may include operations of configuring an item, setting foundational permissions for an item, creating a smart contract for an item, using the asset NFT (as a key) to link the item with translation code, such as GUT code, sending an item to a marketplace, storing/shelving an item not in use, exporting an item to a metaverse environment, exporting an item to any other digital domain, and translating, e.g., GUT code, into functional code for a metaverse environment the item is being sent to.

At step 949 of FIG. 9A, limitations/parameters for the digital asset NFT item may be configured or assigned. Such limitations and/or parameters may be "foundational permissions" and may differ from "hard configurations" described hereinbelow with respect to step 1101 of FIG. 11. Foundational permissions may include tier-levels (described hereinabove with respect to FIG. 3), permissions that interact with the IoT devices (described hereinabove with respect to FIG. 5), maturity ratings (which may prevent inappropriate content from being imported/exported to certain metaverse environments—these may be added to relevant NFTs and may be determined by, e.g., AI/ML algorithms), and/or other configurations. Foundational permissions, such as the preceding examples, as well as other limitations and/or parameters may be configured or assigned in various different ways. The system may configure or assign permissions, limitations, and/or parameters, for example as described hereinabove with respect to FIG. 5. Alternatively, a node may configure or assign permissions, limitations, and/or parameters, for example as described hereinabove with respect to 116 of FIG. 1. Smart contracts may also be used, including by a node, to configure or assign permissions, limitations, and/or parameters, for example as described hereinabove with respect to 121 of FIG. 1. The system may also link the NFT (which may function as a key) with translation code, such as GUT code, at this step. At step 950, the system may determine whether the transaction is a one-party transaction. If no, the system may proceed to step 951. If yes, the system may proceed to step 952. At step 951, the system may proceed to the steps for multiple-party transactions (see FIG. 11, described hereinbelow, for more detail). At step 952, the node may determine whether or not to hold the item at this time. If yes, the system may proceed to step 953. If no, the system will proceed to step 954. At step 954, the system may determine whether the object being exported is a metaverse object. If no, the system may proceed to step 955. If yes, the system may proceed to step 956. At step 953, an asset that is not currently being used may be "shelved" in, e.g., an item database (not shown), at which point it may be stored on a BIRDS until further use.

Continuing with FIG. 9A, at step 955, the node may export the NFT to another (non-metaverse) digital domain. At step 956, the node may export the item to another metaverse environment, e.g., by exporting the item's metaverse path. At step 957, the node may input which metaverse environment the item is being exported to. If it is an existing metaverse environment within a metaverse database (not shown) of, e.g., system 800, the system may proceed to step 960 to gather the necessary information from the metaverse database. If it does not exist within the metaverse database, the system may proceed to step 958, at which point a request may be sent to the new metaverse environment for interoperability. The system may then proceed to step 959, at which point the transaction may be suspended and the NFT may be shelved at step 953 (the item database). After step 960—and transitioning again to FIG. 9B—the system may determine, at step 961, whether the item needs to be translated from, e.g., GUT code into specific functional code for the metaverse environment the item is being exported to. If yes, the system may first translate, e.g., GUT code, into functional code for "metaverse environment two" at step 962. Else, if no, the system may then proceed directly to finding the specified user and assigning the item to the specified user in "metaverse environment two" at step 963; such operations may be performed via, e.g., the user database. At step 964, the item may be deposited for use in the asset database of "metaverse environment two." If the node does not wish to transfer the asset to "metaverse environment two" at this time, "metaverse environment two" may actually function as "metaverse environment one", thus allowing the return of the item to the original environment. This may allow the node to preemptively set up the asset on, e.g., system 800. This may allow the node to speed up a transaction at a future time.

Figure 10:
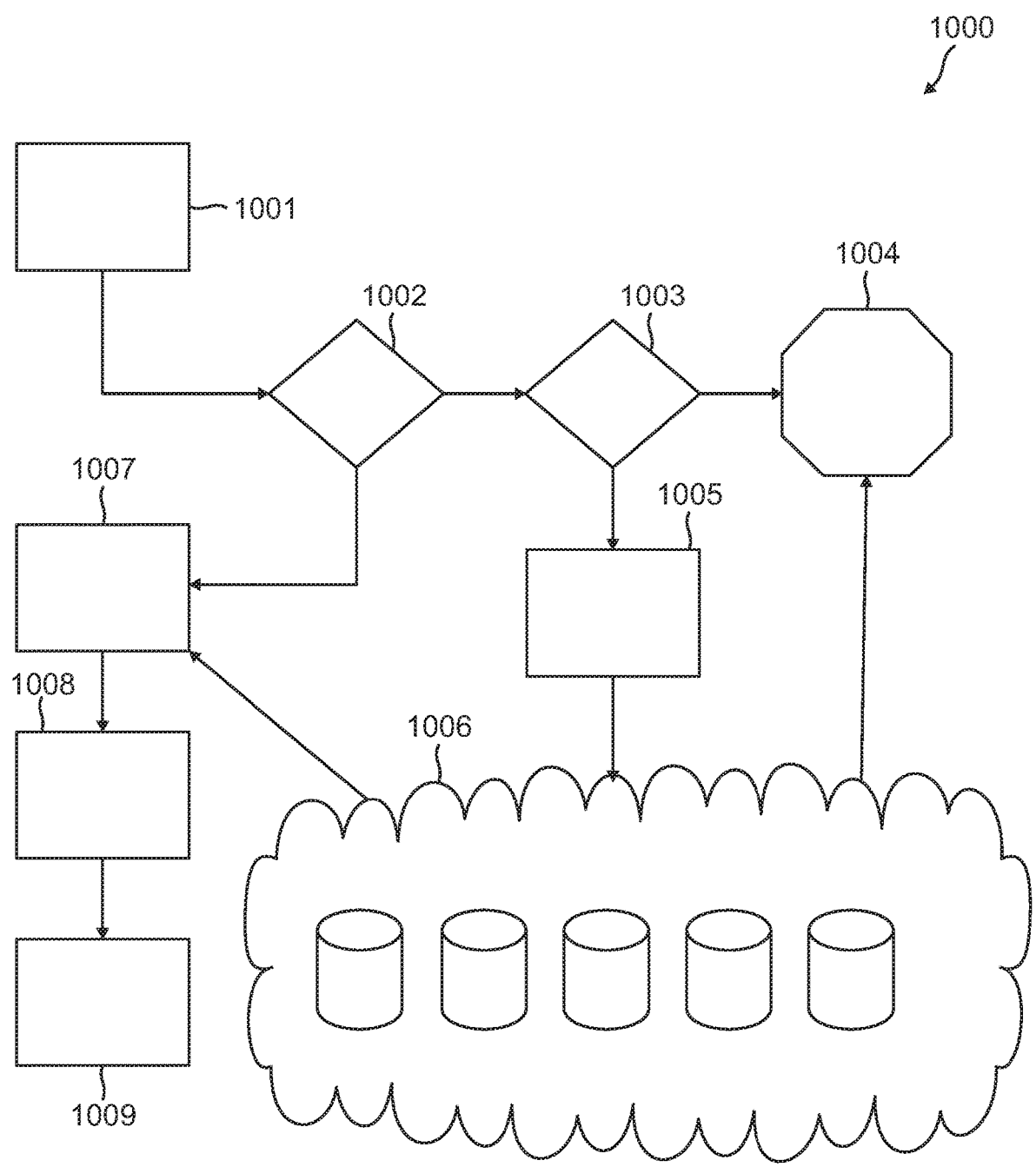
FIG. 10 is a flow diagram of a method for creating an asset NFT for a new physical object according to an embodiment.

FIG. 10 is a flow diagram of a method 1000 for creating an asset NFT for a new physical object according to an embodiment. Method 1000 may be implemented by an exemplary system (not shown).

At step 1001, a node (not shown) may upload relevant information pertaining to a physical object (not shown) for which an asset NFT is being minted; relevant information may include documentation such as deeds, lien information, mortgage information, inspection papers, vehicle identification numbers (VINs), photos, videos, receipts, bank statements, and/or other proof of ownership. At step 1002, the system may determine whether legal proof of ownership is required. Examples of assets requiring legal proof of ownership include heavily regulated assets such as real estate, vehicles, or firearms, etc. If legal proof of ownership is not required, the system will proceed to step 1007. Else, the system may proceed to step 1003. At step 1003, after determining that the asset is a heavily regulated item or other asset requiring legal proof of ownership, the system may determine whether the asset is an approved item or asset. If not, as in the case of, e.g., firearms, black market items, medications, and/or other illegal assets, at step 1004, the system may reject the item or asset and fulfill any legal requirements. Else, if the asset is an approved asset, at step 1005, the system may verify legal ownership and proceed to step 1006. In turn, step 1006 may include checking external ownership databases through the internet and/or WEB3 such as title companies, departments/divisions of motor vehicles (DMVs)/bureaus of motor vehicles (BMVs), blockchains, and/or other databases to verify ownership status of deeds, VINs, liens, and/or any other relevant information. If the asset is not verified, the system may reject the asset at step 1004. Else, the system may proceed to step 1007. At step 1007, the system may proceed to authenticate or verify the physical object, at which point the system may use AI/ML algorithms, such as authenticity algorithms, to ensure or confirm the object is what the node claims it to be. If coming from step 1006, after verification of ownership, the system may verify that the heavily regulated item or other asset requiring legal proof of ownership is what the node represents it to be. If coming from step 1002, the system has determined that the asset is not heavily regulated or does not otherwise require legal proof of ownership. Assets not requiring legal proof of ownership may include objects such as designer fashion items, art, collectibles, or watches, etc. At step 1008, after the AI/ML algorithms have authenticated or verified the authenticity of the asset, the system may proceed to create or mint a unique NFT linked to the asset. Step 1008 may also include using a hash value. At step 1009, the node or a user (not shown) may create a smart contract and/or configure limitations/"foundational permissions" (described in more detail hereinabove with respect to step 949 of method 900 (FIG. 9A)).

Figure 11:
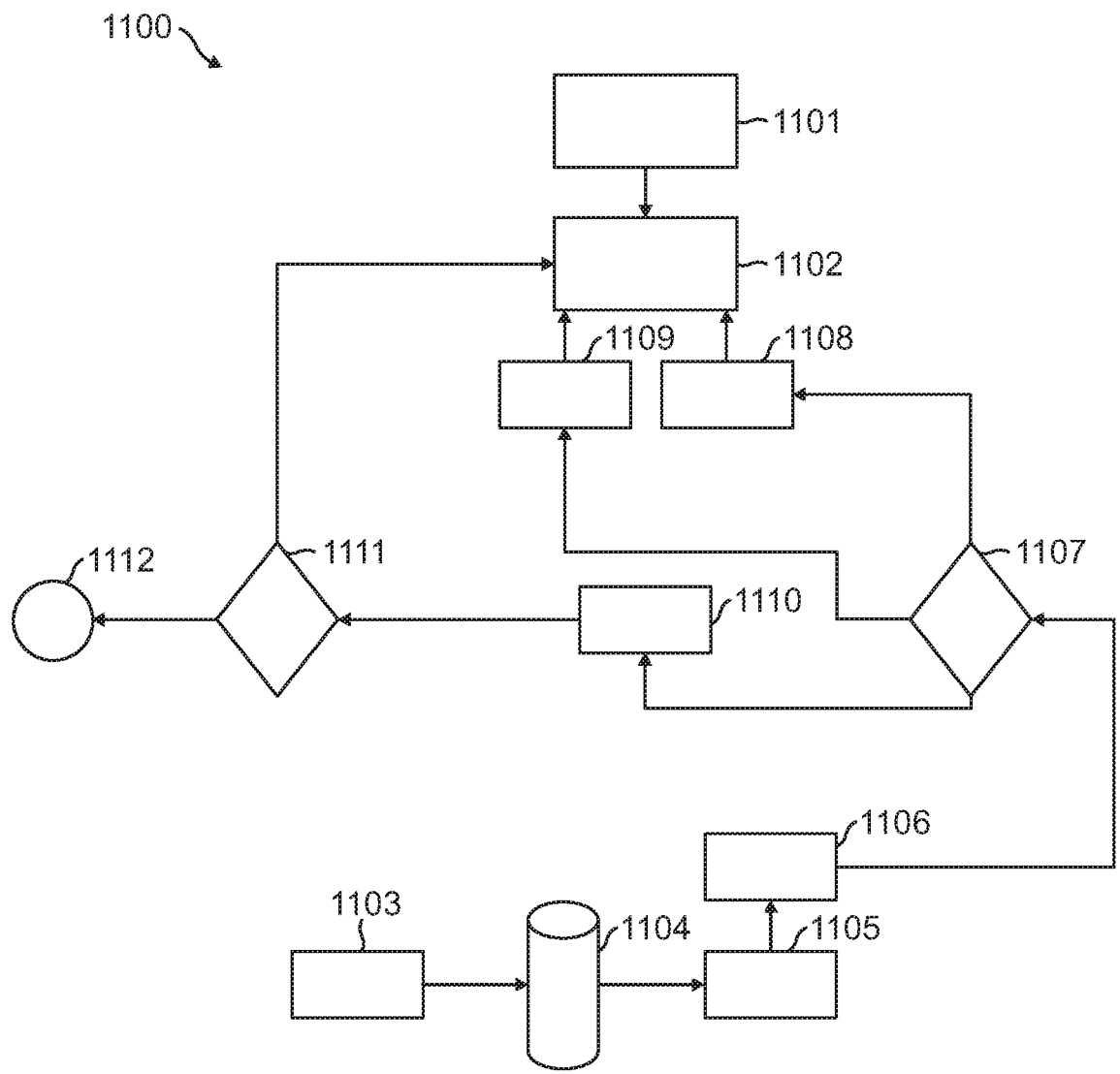
FIG. 11 is a flow diagram of a method for smart contract configuration and multiple-party transactions according to an embodiment.

FIG. 11 is a flow diagram of a method 1100 for smart contract configuration and multiple-party transactions according to an embodiment. Method 1100 may be used to implement a process of configuring a multiple-party smart contract and then trading or exchanging asset NFTs with certain permissions and configurations between nodes. A process implemented via method 1100 may include purchasing, selling, loaning, renting, borrowing, using, exchanging, and/or trading an asset NFT between two or more parties or nodes, at which point the parties or nodes will be directed to a marketplace application (described in more detail hereinbelow with respect to FIG. 12). Method 1100 may be implemented by an exemplary system (not shown).

Multiple-party transactions are any transactions that involve another node with a separate ID NFT.

Referring to FIG. 11, step 1101 of method 1100 is from a perspective of a node (not shown) listing an asset NFT on a marketplace (referred to as an "offering" node), while steps 1103-1112 are from the perspective of a node (not shown) requesting the asset (referred to as a "receiving" node).

At step 1101, the offering node may specify or indicate an intent to make, enter, and/or configure a multiple-party transaction or smart contract and may allow certain configurations to be set (e.g., credentials of receiving node, translation/recoding restrictions, aggregate value restrictions, aggregate score restrictions, time specification range, legal/country restrictions, permission restrictions, metaverse restrictions, payment terms, geofencing, geo-location, sell, loan, trade, etc.). To clarify and to avoid perceived redundancy, it should be noted that the aforementioned exemplary configurations are "hard configurations" that may be required to be fulfilled by transacting parties or nodes through a smart contract as opposed to filters/desired preferences and parameters set within a marketplace application, such as at steps 1202 and 1212 of method 1200 (FIG. 12), depending on which side of a transaction a node is on. At step 1102, a NFT will go through or be engaged with a marketplace application, described in more detail hereinbelow with respect to FIG. 12.

At step 1103, the receiving node may setup a request for an asset. At step 1104, the system may check a user database for the receiving node's account. At step 1105, the system may verify or authenticate the receiving node. At step 1106, the receiving node may make a marketplace request for the asset. The receiving node may set multiple-party specifications for the desired asset (e.g., credentials of offering node, desired translation/recoding terms, aggregate value range, desired aggregate score restrictions, desired time specification range, legal/country restrictions, metaverse environment restrictions, payment terms, geofencing, buy, rent, lease, borrow, trade, etc.) at step 1106. At step 1107, the receiving node may indicate a type of desired asset. At step 1108, the system may determine the desired asset to be a non-metaverse digital NFT and may proceed to step 1102 for a corresponding desired asset. At step 1109, the system may determine the desired asset to be a physical asset NFT and may proceed to step 1102 for a corresponding desired physical asset NFT. At step 1110, the system may determine the desired asset to be a metaverse-capable NFT and may proceed to step 1111. At step 1111, the system may determine whether a metaverse of the desired object is currently supported. If not, at step 1112, the system may exit the request process. Else, at step 1102, the receiving node may be directed to a marketplace application for a corresponding desired metaverse asset.

Figure 12:
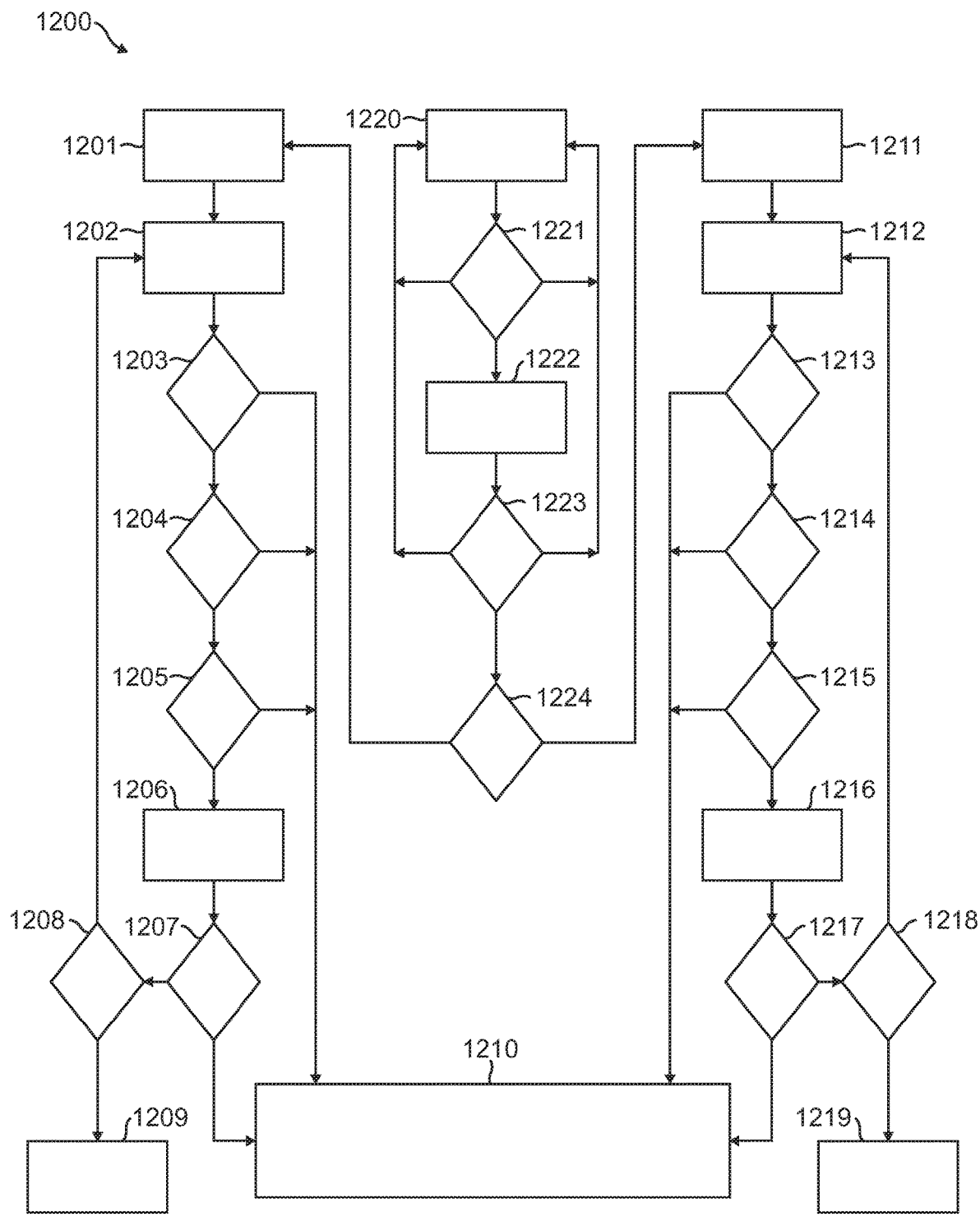
FIG. 12 is a flow diagram of a method depicting an embodiment of a marketplace application.

FIG. 12 is a flow diagram of a method 1200 depicting an embodiment of a marketplace application. In an example embodiment, nodes in the marketplace application can buy, sell, loan, rent, borrow, use, exchange, or trade asset NFTs. Nodes listing an asset NFT on a marketplace are referred to as "offering" nodes, while nodes requesting an asset are referred to as "receiving" nodes. Method 1200 may be implemented by an exemplary system (not shown).

Steps 1201-1209 may represent a receiving node's or authorized user's side of a marketplace, whereas steps 1211-1219 may represent an offering node's or owner's side of a marketplace. Steps 1220-1224 may be required when there are multiple nodes on either side of a transaction, e.g., a multiple-parties' agreement, and may include an iterative process for a subset node(s) and a set of nodes (or a set of one node) to make an exchange proposal and come to an agreement on specific terms of a smart contract.

At step 1201, a receiving node (not shown) may input a description of a desired asset NFT being sought after in a marketplace. At step 1202, the receiving node may set parameters or defined filters, which may be node-defined filters, on preferences of an asset and node specifications they are searching for (e.g., desired aggregate computational value offering node, desired aggregate score of offering node, desired geo-location of offering node, desired geofencing parameters, age-range of offering node, credentials of offering node, desired metaverse environment, etc.). It should be noted that such exemplary parameters and/or filters may be preferences within a marketplace as opposed to "hard configurations" for multiple-party transactions set by a smart contract, for example, as described hereinabove with respect to FIG. 11, and may be different from "foundational permissions" described hereinabove with respect to FIGS. 9A-B, including step 949 (shown in FIG. 9A). Step 1202 may include using AI/ML to make suggestions of filters being used for similar asset NFTs. At step 1203, the receiving node may request a specific offering node to transact with. If a specific offering node meets the receiving node's requirements, the receiving node may proceed to step 1210, described in more detail hereinbelow. Else, if no offering node meets the receiving node's requirements, the receiving node may proceed to step 1204, at which point it may evaluate or analyze a list of other trusted offering nodes (these may be nodes through which successful and/or satisfactory transactions were made in the past). If there are trusted offering nodes that have the desired asset NFT and fulfill the defined filters, the receiving node may proceed to step 1210. Else, if not, the receiving node may proceed to step 1205, at which point the receiving node may evaluate or analyze "$2^{nd}$ tier" trusted offering nodes that have the desired asset NFT and fulfill the defined filters. If there are $2^{nd}$ tier trusted offering nodes that fulfill these conditions, the receiving node may proceed to step 1210. If there are not $2^{nd}$ tier trusted offering nodes that fulfill these conditions, the receiving node may proceed to step 1206, in which matching through AI/ML algorithms may generate a general pool of matches and fulfill the desired asset configurations. At step 1207, the receiving node may determine whether there are any satisfactory matches for the desired asset NFT and defined filters. If there are no matches at step 1207, the receiving node may proceed to step 1208 and the system may ask the receiving the node if it would like to wait for a match. If the receiving node chooses not to wait at step 1208, it may return to step 1202, at which point it may input different filters. If the receiving node chooses to wait, it may proceed to step 1209, at which point the asset NFT will remain or stay in a marketplace database (not shown) until a match is found. If there are matches at step 1207, the receiving node may proceed to step 1210. At step 1210, all transacting nodes on both sides of a smart contract may agree on smart contract(s) and confirm a transaction.

At step 1211, an offering node (not shown) may input a description of an asset NFT being sold, loaned, borrowed, used, exchanged, or traded. At step 1212, the offering node may define attributes of the asset NFT and create a list of acceptable NFT parameters (e.g., desired aggregate computational value of receiving node, desired aggregate score of receiving node, desired geo-location of receiving node, desired geo-fencing range of receiving node, age of receiving node, credentials of receiving node, metaverse environment restrictions, etc.). It should be noted that such exemplary attributes and parameters may be preferences within a marketplace as opposed to "hard configurations" described, for example, hereinabove with respect to FIG. 11 and are different from "foundational permissions" described, for example, hereinabove with respect to FIGS. 9A-B. Step 1212 may be similar to process 1202 and the system may make suggestions based off of similar asset NFT transactions. At step 1213, the offering node may request a specific node to transact with. If there is a specific receiving node that meets the offering node's requirements, the offering node may proceed to step 1210. If there is not a specific receiving node that meets the offering node's requirements, the offering node may proceed to step 1214, at which point it may evaluate or analyze a list of other trusted receiving nodes (these may be nodes through which successful and/or satisfactory transactions were made in the past). If there are trusted receiving nodes that have the desired asset NFT and fulfill the defined filters, the offering node may proceed to step 1210. If not, the offering node may proceed to step 1215, at which point the offering node may evaluate or analyze $2^{nd}$ tier trusted receiving nodes that have the desired asset NFT and fulfill the defined filters. If there are not $2^{nd}$ tier trusted receiving nodes that fulfill these conditions, the offering node may proceed to step 1216, in which matching made through AI/ML algorithms may generate a general pool of matches that fulfill the defined filters. At step 1217, the system may determine whether there are any satisfactory matches for the desired asset NFT and defined filters. If there are no matches at step 1217, the system may proceed to step 1218 and ask the offering node if it would like to wait for a match. If the offering node chooses not to wait at step 1218, it may return to step 1212, at which point it may input different filters. If the offering node chooses to wait, it may proceed to step 1219, at which point the asset NFT may remain or stay in the marketplace database until a match is found.

At step 1220, a subset node (or subset of nodes) may make an exchange proposal to a set of nodes (or set of a node) regarding a specific asset NFT. At step 1221, the system may prompt input from the specified set of nodes to determine whether a plurality (in this instance the definition of plurality meaning the largest percentage of a set of specified nodes) of the set of nodes are in agreement (it should be noted that depending on the terms of the agreement it may be a totality, majority, plurality, or otherwise, but for the purpose of simplifying the language "plurality" will be used from here on out). The set of nodes may be a set of authorized parties. If a plurality of the set of specified nodes are not in agreement with the proposal at step 1221, they may return to step 1220, at which point they may try to make another exchange proposal. If a plurality of a set of specified nodes would like to modify the proposal, they may return to step 1220, at which point they may make suggested changes to the proposal. If a plurality of a set of specified nodes are in agreement with the proposal at step 1221, they may proceed to step 1222, at which point a smart contract may be configured. At step 1223, the system may prompt input from a set of specified nodes to determine whether a plurality of a set of specified nodes are in agreement with all specific terms of the smart contract. If a plurality of a set of specified nodes are not in agreement with the specifications of the smart contract, they may return to step 1220, at which point they may try to make another exchange proposal. If a plurality of a set of specified nodes would like to modify the specifications of the smart contract, they may return to step 1220, where they can modify the specifications of the smart contract. Note that the difference between steps 1221 and 1223 is that at step 1221, the set of specified nodes are deciding whether or not they are willing to make an exchange with the specific asset NFT offered by the subset node(s), whereas at step 1223, the set of specified nodes have the opportunity to modify the specific terms of the smart contract. If a plurality of a set of specified nodes agree on the final specifications of the smart-contract, they may proceed to step 1224, where the system may determine whether to direct them to, e.g., receive a specific asset NFT, at step 1201 or to, e.g., offer a specific asset NFT, at step 1211. If the set of nodes configured a smart contract to acquire, receive, or use a specific asset NFT, they may proceed to step 1201. If the set of nodes configured a smart contract to offer, sell, or loan out a specific asset NFT, they may proceed to step 1211.

Figure 13:
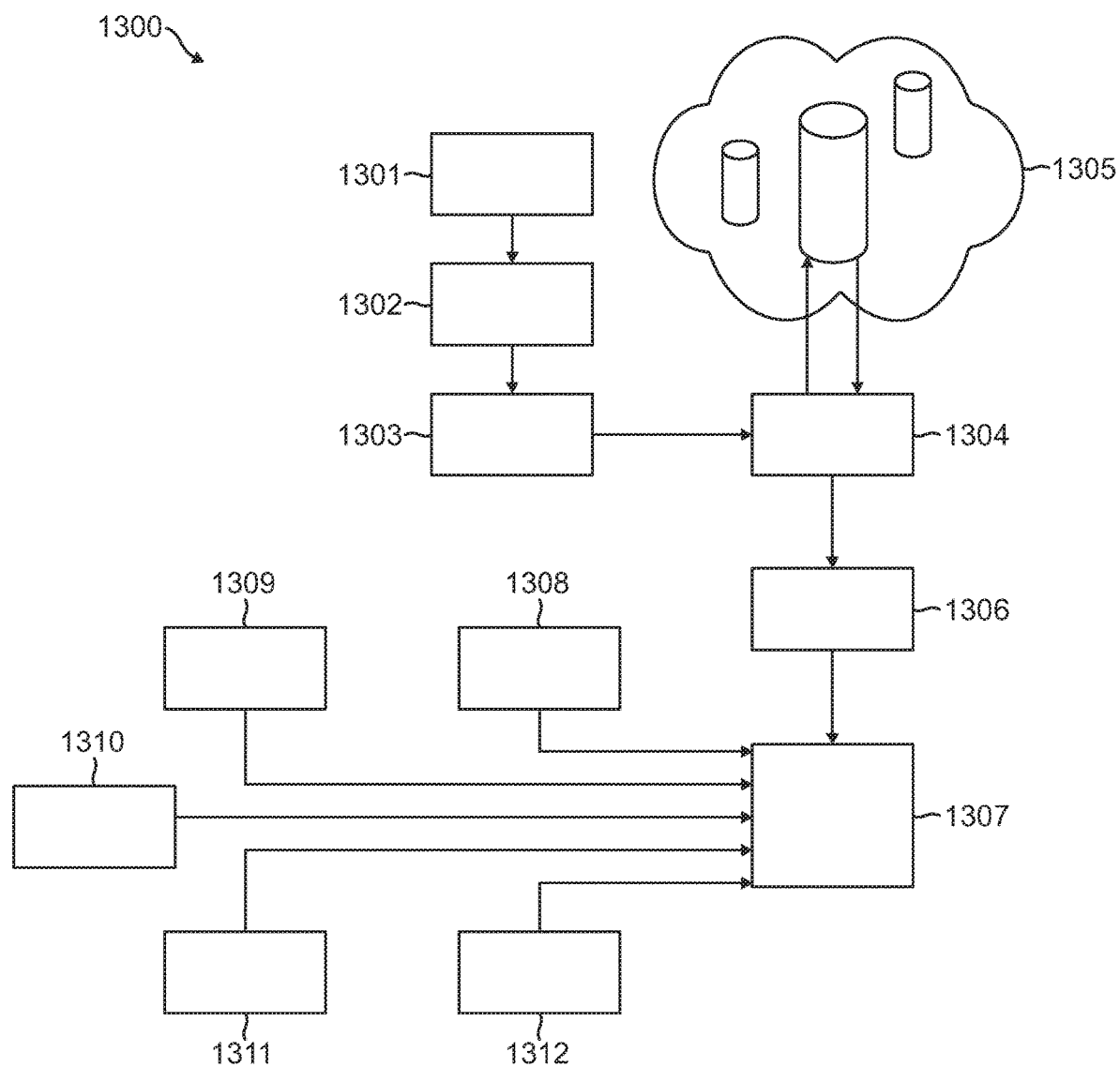
FIG. 13 is a flow diagram of a method for new user creation, ID NFT minting, and score generation according to an embodiment.

FIG. 13 is a flow diagram of a method 1300 for new user creation, ID NFT minting, and score generation. Method 1300 may be implemented by an exemplary system (not shown). Using, for example, multi-factor authorization, biometric scans, a proprietary verification system, and/or cross-referencing information through various Internet/WEB3 and other known databases, the system may mint an ID NFT for a new user. The system may then create or generate a score that represents the user's virtual identity as well as physical identity for an accurate overview of the user's overall trustworthiness. Steps 1301-1306 elaborate on steps 403-406 described hereinabove with respect to FIG. 4. Steps 1306-1312 elaborate on aspects of the scoring engine 200 described hereinabove with respect to FIG. 2.

At step 1301, a client node, e.g., a user, (not shown) sends a new user request. At step 1302, the system may prompt the user to complete a multi-factor authentication. This may require the user to authenticate identity by successfully completing multiple physical and electronic verification and/or authentication methods (e.g., two physical and two electronic methods such as ID upload and physical address verification, and email and text/phone call verification). At step 1303, the system may prompt the user to submit biometric scan(s) (e.g., thumbprint, facial scans, voice recognition, iris scans, heartbeat, and/or cadence of walk, etc.). At step 1304, the system may use an, e.g., proprietary, verification or authentication system (it should be noted that AI/ML algorithms may be used in the verification system) to establish a verified identity, which may be cross-referenced through various known Internet/WEB3 databases at step 1305. After verification, the system may direct the node to step 1306, and the system may establish a new user and mint a unique and secure ID NFT for the user. At step 1307, the system may connect the ID NFT with multiple data sets to establish an aggregate score, such as via a scoring engine, which may employ, e.g., an AI/ML algorithm. Step 1308 may include retrieving or collecting data from marketplace transactions that may be used to make up the aggregate score. Step 1309 may include retrieving or collecting data from various credit ratings that may be used to make up the aggregate score. Step 1310 may include retrieving or collecting data from an, e.g., proprietary, list of other scoring metrics or methods that may be used to make up the aggregate score. Step 1311 may include retrieving or collecting data collected from the node's behavior that may be used to make up the aggregate score. Such data may, for example, include successful referrals, attempted minted asset NFTs (authentic or fraudulent), level of past trustworthiness, level of profile "completeness", and/or ability to consistently abide by terms, etc. Step 1312 may include retrieving or collecting other Internet or WEB3 scoring metrics that may be used to make up the aggregate score (e.g., eBay®, PayPal®, Amazon.com®, etc.).

Figure 14:
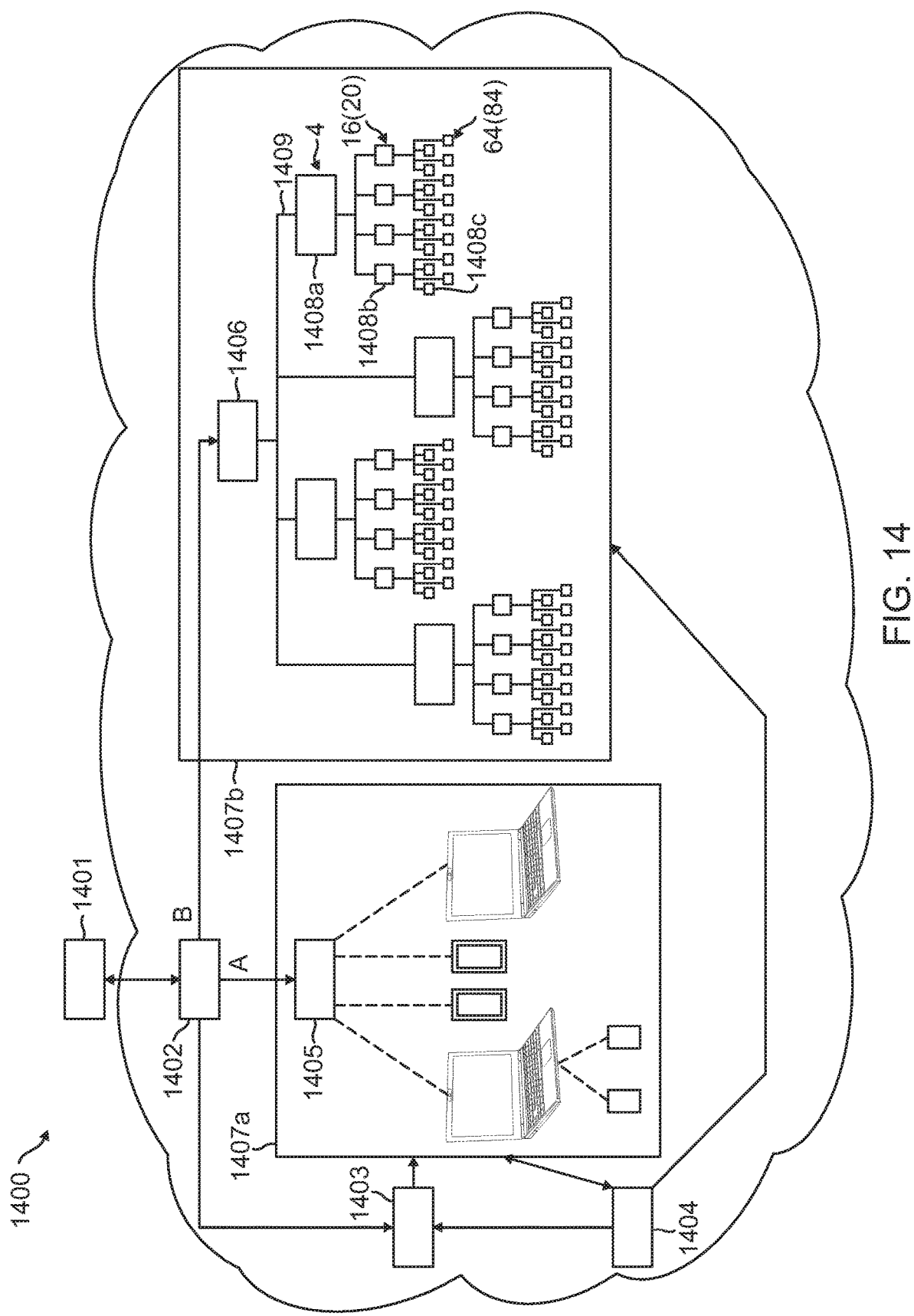
FIG. 14 is a simplified block diagram of a system for distributed electronic asset storage and transaction processing according to an embodiment.

FIG. 14 is a simplified block diagram of a system 1400 for distributed electronic asset storage and transaction processing according to an embodiment. In one such embodiment, system 1400 may be, e.g., a Blockchain-Integrated Redundant Distributed System (BIRDS). According to an example embodiment, system 1400 includes at least one blockchain network, e.g., networks 1407a and/or 1407b, one or more servers (not shown), and one or more nodes, e.g., nodes 1401, 1402, 1405, and/or 1406, operatively communicating with the one or more servers via the at least one blockchain network, where each of the one or more nodes includes one or more memories (not shown) and one or more processors (not shown).

In an embodiment, the one or more servers may be configured to store one or more electronic assets (not shown) in the one or more memories of the one or more nodes. According to one such embodiment, storing the one or more electronic assets may occur in response to a storage request received from a node, e.g., node 1401. For example, as shown at 1401 of FIG. 14, a requesting node may transmit or submit a request for storage. In another embodiment, the storage may be a type of BIRDS request, such as a storage resource request, among other examples. According to an embodiment, a storage resource request may be for, e.g., a specific amount of storage space; the amount of storage space may also be unspecified. In one such embodiment, the storage space may be used for storing, e.g., any data, files, content, and/or information, etc. For example, according to an embodiment, the storage space may be used to store one or more digital assets. In an embodiment, as shown in FIG. 14, a storage request may follow pathway B. According to an example embodiment, for a storage request, data or file(s) to be stored may be encrypted with quantum resistant encryption. In one such embodiment, the data or file(s) may also be divided into fragments for dispersion. Further, according to an embodiment, redundancy data or file(s) may be created. Last, at 1406 of FIG. 14, in another embodiment, the data or file(s) may be distributed to a highest-ranked available node for storage.

In an example embodiment, the one or more servers may further be configured to process one or more transactions on the at least one blockchain network using the one or more processors of the one or more nodes. According to one such embodiment, processing the one or more transactions may occur in response to a processing request received from a node, e.g., node 1401. For example, as shown at 1401 of FIG. 14, a requesting node may transmit or submit a request for processing, e.g., for CPU resources. In another embodiment, the storage may be a type of BIRDS request, such as a processing resource request or CPU resource request, among other examples. According to an example embodiment, as shown in FIG. 14, a processing request may follow pathway A. In one such embodiment, where a processing request is for, e.g., creation/usage of translation code, such as GUT code, blockchain updates, or metric/reward data gathering, data may be encrypted with quantum resistant encryption. According to another embodiment, the data may then be divided into fragments by inherent parallelism and redundancy checks may be performed. Last, in an embodiment, at 1405 of FIG. 14, the data may be distributed to a highest-ranked available node for processing.

With respect to system 1400 of FIG. 14, it should be noted that a requesting node, e.g., node 1401, may make either or both of a storage request and a processing request.

According to an embodiment, the one or more servers of system 1400 may further be configured to determine a reward value for a given node of the one or more nodes, where the reward value is based on one or more of: (i) reliability of the given node, (ii) availability of the given node, (iii) storage space of one or more memories of the given node, (iv) computing cycles of the one or more processors of the given node, (v) a computational aggregate value corresponding to the given node, and (vi) a computational aggregate score corresponding to the given node. For example, in an embodiment, at 1402 of FIG. 14, a first responding node may be determined by non-controllable factors such as internet or network access topology, laws of physics, physical location, and/or internet provider, etc., or any other suitable known factors. According to an example embodiment, the first responding node may coordinate all requests for storage or processing from a requesting node, serving as an intermediary between the requesting node and a remainder of the at least one blockchain network, which may be, e.g., a BIRDS network. In an embodiment, the first responding node may determine, using blockchain, appropriate nodes to fulfill a request. For each of the two request types, according to an embodiment, the at least one blockchain network, e.g., networks 1407a and/or 1407b, may maintain a ranked list based upon, e.g., reliability, availability, storage space, computing cycles, computational aggregate value, and/or computational aggregate score, or any other suitable criteria and/or metrics known in the art. In an embodiment, the first responding node may access the ranked list and choose a highest-ranked available node to begin fulfilling the request.

At 1403 of FIG. 14, according to an embodiment, two blockchain ledgers may be maintained by system 1400—one for processing resource requests and one for storage resource requests. In another embodiment, the two blockchain ledgers may be ranked by metrics that are based upon, e.g., availability, reliability, and/or other suitable known factors in a proprietary manner. According to yet another embodiment, all blockchain processes of system 1400 may be performed via a blockchain network such as a BIRDS network, among other examples.

At 1404 of FIG. 14, in an embodiment, system 1400 may maintain metric data on both processing and storage participants (such as, e.g., processing speed, latency, storage space, physical location, availability, reliability, computing cycles, computational aggregate value, and/or computational aggregate score, etc., or other suitable metrics known in the art). According to an embodiment, rewards may be based upon system 1400's usage of nodes' resources. In another embodiment, system 1400 may also, for example, perform metric verification at 1404. Further, according to yet another embodiment, metric and/or reward data gathering may be performed among processing network 1407*a* and/or storage network 1407*b*, described hereinbelow in relation to 1405 and 1406, respectively.

At 1405 of FIG. 14, in an embodiment, a highest-ranked available node for processing may determine if it alone is able to fulfill a request. If so, according to an embodiment, all processing may be done on this node and completed data may be returned to a first responding node. Else, in another embodiment, if the highest-ranked available node for processing is not able to fulfill the request, it may access a blockchain ledger (e.g., at 1403) for processing requests to marshal additional processing nodes, e.g., nodes 1408*a*, 1408*b*, and/or 1408*c*. According to yet another embodiment, if the additional processing nodes are still unable to fulfill the request, each of the additional processing nodes may access the blockchain ledger for processing to marshal yet further processing nodes (e.g., up to four nodes, or any other suitable number of nodes). In an embodiment, additional generations of nodes can be marshalled to fulfill the processing request. According to an example embodiment, this exponential algorithm allows for maximum amounts of processing power and near-infinite scalability. In an embodiment, each node in system 1400 may be able to determine storage and/or processing needs for a given request and may generate a tree of nodes to fulfill the request. According to an example embodiment, generating a tree of nodes may include choosing nodes based upon one or more factors that are used to determine a reward value. In an embodiment, if, e.g., a request is sufficiently large, a given node may not be able to fulfill the request, and the node may choose additional nodes to fulfill the request, thus creating a tree of nodes. According to another embodiment, the tree of nodes may then fulfill the request, sending all data back to the requesting node through the first responding node. In one such embodiment, each node may be capable of marshalling necessary nodes to fulfill a request and creating, if needed, a network, tree, or graph, among other examples, of nodes to distribute the request. Such an, e.g., network, tree, or graph may be referred to as a BIRDS processing network.

In an embodiment, at 1406 of FIG. 14, a highest-ranked available node for storage may access a blockchain to create, e.g., a three-level tree, such as tree 1409, composed of, e.g., four first-tier nodes, such as nodes 1408*a*, 16 second-tier nodes, such as nodes 1408*b*, and 64 third-tier nodes, such as nodes 1408*c*. According to an embodiment, redundant, fragmented, and/or encrypted data or file(s) may then be distributed to these, e.g., four, 20, or 84 nodes (total number of nodes in cases of one, two, or three tiers, respectively) with one fragment retained by the highest-ranked available node for storage. In an example embodiment, a significant percentage of the fragments may be redundant copies to maximize availability for retrieval. The, e.g., tree created at 1406 may be referred to as a BIRDS storage network.

Figure 15:
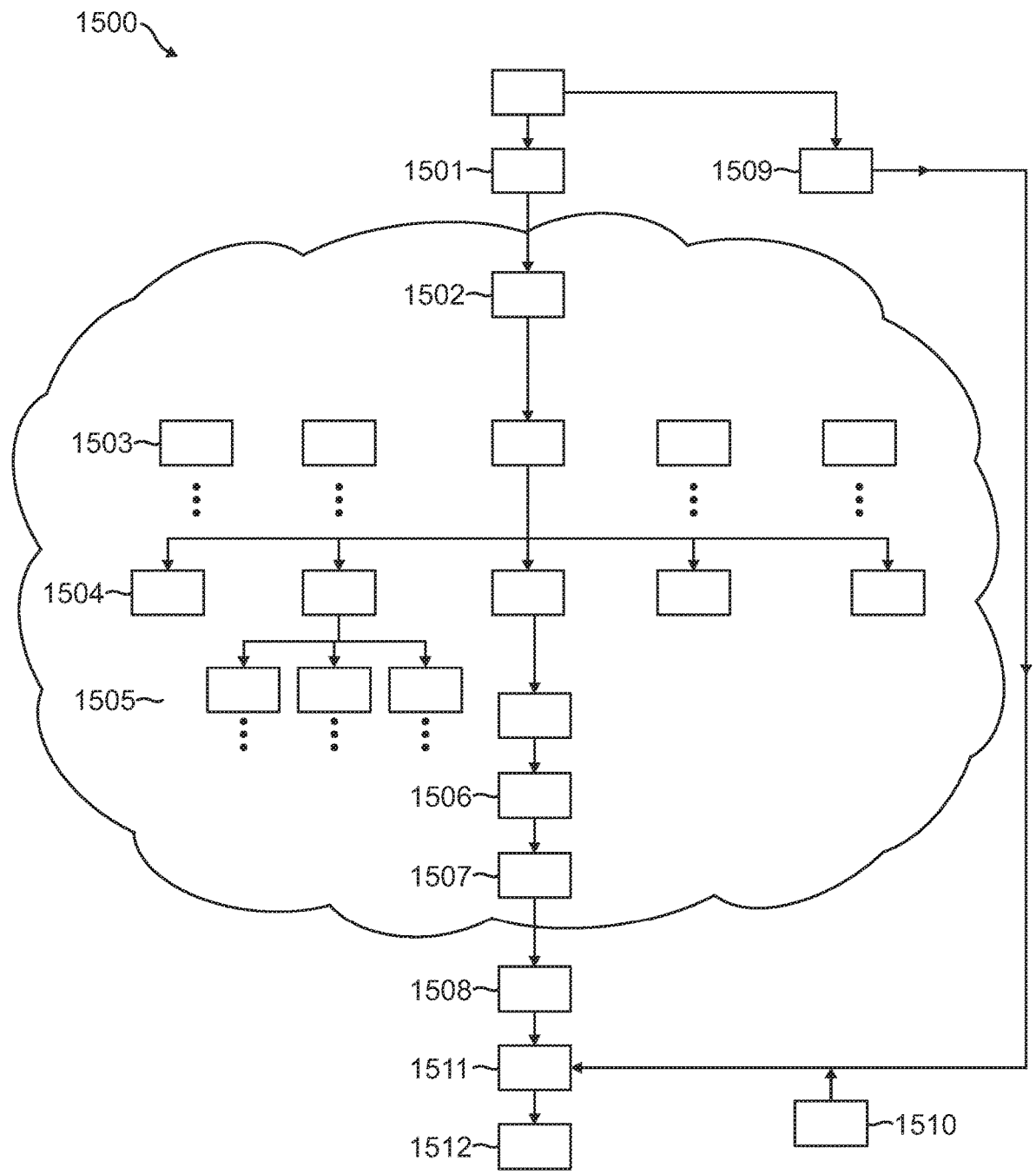
FIG. 15 is a simplified block diagram of an overview of a method for translation of a digital item in a first online environment according to an embodiment.

FIG. 15 is a simplified block diagram of an overview of a method 1500 for translation of a digital item in a first online environment according to an embodiment. Translation of a digital item according to certain embodiments may provide for interoperability of digital items, e.g., electronic assets, between multiple online, e.g., metaverse, environments and facilitation of an "Internmet" (an interconnected system of metaverse environments that connects nodes around the world via, e.g., a GUT protocol, and provides for digital objects to operate in multiple metaverse environments).

In an embodiment, at 1501, method 1500 may determine that the digital or metaverse item in the first online environment, e.g., a "Metaverse One" environment, is to be translated into, e.g., GUT code (see 911 of FIG. 9A described hereinabove). According to one such embodiment, a metaverse such as the "Metaverse One" environment may be, e.g., a Star Wars®-themed metaverse environment and the digital item may be, e.g., a light saber. In an example embodiment, method 1500 may include creating a smart contract; the smart contract may then be used to generate translation code, such as GUT code, for the digital item.

According to an embodiment, method 1500 may further include, generating, via the created smart contract, translation code, e.g., GUT code, for the digital item based on native code of the digital item. In one such embodiment, the native code may correspond to a content of the digital item in the first online environment, and the translation code may represent one or more unique attributes of the digital item. According to an example embodiment, generating the translation code may be performed via 1502-1507 of FIG. 15, which is a cloud that represents a GUT quantitatively qualifying process (see 912 of FIG. 9A described hereinabove). In an embodiment, code for the GUT quantitatively qualifying process may run on a processing aspect of, e.g., system 1400 (described hereinabove with respect to FIG. 14), and may include, for example, tabulating or enumerating attributes of the digital item by, e.g., a branching tree method, or any suitable method known in the art.

According to an embodiment, at 1502 of FIG. 15, categorization may begin or commence by a processing request being sent to, e.g., system 1400 of FIG. 14.

In an embodiment, at 1503 of FIG. 15, top-level categories may include classes such as: Vehicles, Wearables, Weapons, and/or Minions/Mounts, etc., or any other suitable classes known to those in the art. According to an example embodiment, other categories may include, e.g., character skins, characters themselves, etc., or any other suitable known categories. In another embodiment, Weapons may be an appropriate top-level category.

According to an embodiment, at 1504 of FIG. 15, each top-level category may be broken into multiple second-level categories. In an example embodiment, a digital item may have multiple values at this level. According to another embodiment, a digital item such as a weapon may have a specific class (e.g., "Blade"), a damage categorization, e.g., a scale in a range of 1-1024, a specialized user (e.g., "Jedi"), and/or special characteristics (e.g., "Vorpal"), etc. In yet another embodiment, as a further example, a top-level category such as Wearables may have subcategories including, e.g., Jewelry, Shoes/Boots, Armor, and/or Clothing.

In an example embodiment, at 1505 of FIG. 15, a third level and any subsequent level(s) may have one subclass (e.g., "Sci-Fi Blade" under "Blade") or multiple subclasses, such as damage done to specific targets (items, personnel/creatures, and/or ships, etc.). According to one such embodiment, characterization may contain additional levels beyond a third level.

At 1506 of FIG. 15, in an embodiment, a digital item may be further categorized by nodes, such as in a tree data structure, and/or, e.g., an AI/ML algorithm or other suitable known algorithm for tabulating or further enumerating the digital item's specific attributes. For a light saber, according to an embodiment, categorization may include: an ability to cut through things, an ability to be thrown, specific damage dealt, weight, style, shape, dimensions, type(s) of crystal power(s), color of blade, number of blades, one- or two-handed, length of blade, activation method, attachment points, battery type, and/or duration, etc., among other examples. In an example embodiment, one or more leaf nodes of a tree data structure may be generated or populated with categories and/or "descriptives" such as a digital item's color, armor, value, weight, and/or special abilities, etc.

In an embodiment, at 1507 of FIG. 15, a finalized GUT code may contain a complete "quantitative qualification." According to an example embodiment, a final GUT code 1507 may include, e.g., information such as everything about a light saber, everything a light saber can do, and/or how it does it.

At 1508 of FIG. 15, according to an embodiment, a GUT-coded version of a digital item may be stored on, e.g., system 1400 of FIG. 14 via a storage request, for, e.g., later use or importation into a "Metaverse Two" (see 1509).

In an embodiment, at 1509 and 1510 of FIG. 15, before a digital item, e.g., an electronic asset, can be exported or imported, respectively, from an online, e.g., metaverse, environment, a one-time enumeration or assessment may be performed of the laws, rules, and/or mechanics of the online environment, e.g., "Metaverse One" or "Metaverse Two," from which the digital item originated. According to an example embodiment, AI/ML or another suitable approach known in the art may be used for a one-time enumeration/assessment. In one such embodiment, enumeration/assessment may only need to be performed on subsequent occasions when updates to an online environment occur. According to an embodiment, performing the enumeration/assessment may, for example, facilitate making a comparison between the native online environment and the desired online environment the digital item is being imported to, and may, for example, also provide for working mechanics that fit the desired online environment. Further, in another embodiment, performing the enumeration/assessment may harmonize the attributes and/or abilities of the digital item with the online environment to which it is being imported or transported. According to yet another embodiment, such harmonization may ensure that a digital item will not be too powerful, dysfunctional, useless, and/or unbalanced, etc. in the new environment.

At 1511 of FIG. 15, in an embodiment, method 1500 may harmonize or reconcile an online, e.g., metaverse, environment's laws, rules, and/or mechanics from either or both of an exporting online environment (1509) and an importing online environment (1510). Further, according to an embodiment, method 1500 may prepare a digital item for a new online environment. A digital item prepared in such a manner at 1511 may be an import-ready item. In one such embodiment, AI/ML or other suitable approaches known in the art may be used for harmonization/reconciliation. For example, according to an embodiment, recharging a light saber—in cases where recharging is needed—in a metaverse environment where electricity is a magical construct may be difficult or impossible. Harmonization/reconciliation employed by certain embodiments ensures smooth interoperability and/or usability of metaverse objects within different metaverse environments.

Continuing with FIG. 15, at 1512, an NFT, e.g., an asset NFT, may be minted for the asset using a hash of the digital asset, for example, according to process 913 of FIG. 9A described hereinabove.

FIG. 16 is a simplified block diagram of an exemplary computer-based system 1600 for securely controlling an electronic asset according to an embodiment. System 1600 includes a blockchain encoding system 1601. In turn, blockchain encoding system 1601 includes a blockchain computing node 1602, a machine learning (ML) oracle system 1603, an encoder 1604, a registration node 1605, and a computing node 1606. Blockchain computing node 1602 is configured to identify an asset NFT pertaining to the electronic asset. ML oracle system 1603 is configured to computationally evaluate an ownership status of the electronic asset according to a proof of ownership provided by an owner node (not shown). The owner node is paired with the electronic asset. Encoder 1604 is configured to respond to ML oracle system 1603 based on the ownership status of the electronic asset by encoding or generating the asset NFT with an embedded smart contract (not shown) configured to automatically attest a representation of an identity of the owner node or a representation of an identity of an authorized user node (not shown). The authorized user node is paired with the electronic asset. Registration node 1605 is configured to register the asset NFT with the attestation of the representation of the identity on a blockchain (not shown). Computing node 1606 is configured to perform a task involving the electronic asset, and the attestation of the representation of the identity, in response to receiving a task request from the owner node or the authorized user node, and securely control the electronic asset.

Furthermore, in an embodiment, the translation code is configured to make the digital item usable in one or more additional online environments, where the one or more additional online environments are different from the first online environment.

The teachings of all patents, published applications, and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A computer-implemented method of securely controlling an electronic asset, the method comprising:
   identifying an asset non-fungible token (NFT) pertaining to the electronic asset;
   computationally evaluating an ownership status of the electronic asset according to a proof of ownership provided by an owner node, the owner node being paired with the electronic asset;

responsive to evaluating the ownership status of the electronic asset, binding the asset NFT with at least one of: (i) a representation of an identity of the owner node and (ii) a representation of an identity of an authorized user node, the authorized user node being paired with the electronic asset;

registering the bound at least one representation of the identity and the asset NFT on a blockchain associated with the electronic asset; and computationally performing a task involving the electronic asset, and the bound at least one representation of the identity, in response to receiving a task request from at least one of the owner node and the authorized user node and securely controlling the electronic asset.

2. The method of claim 1, wherein the at least one representation of the identity comprises at least one identification (ID) non-fungible token (NFT), and further comprising:

generating one or more ID NFTs respectively corresponding with one or more nodes associated with the electronic asset, the generated one or more ID NFTs including biometric identity data pertaining to the corresponding one or more nodes, the generated one or more ID NFTs further including the at least one ID NFT, the one or more nodes including the owner node and the authorized user node.

3. The method of claim 2, wherein the generated one or more ID NFTs respectively confer permissions upon the owner node, and upon the authorized user node, with regards to the electronic asset, such that the permissions conferred upon the owner node are broader than the permissions conferred upon the authorized user node, the permissions conferred upon the owner node including a permission to assume control of the electronic asset from the authorized user node at any time.

4. The method of claim 1, wherein identifying the asset NFT pertaining to the electronic asset comprises at least one of: (i) tokenizing the electronic asset by encoding the asset NFT and (ii) importing a previously minted asset NFT pertaining to the electronic asset.

5. The method of claim 1, further comprising, prior to identifying the asset NFT pertaining to the electronic asset, verifying authenticity and ownership of the electronic asset by:

configuring an artificial intelligence (AI) module to train a model for the authenticity and ownership of the electronic asset based upon one or more external data sources.

6. The method of claim 1, wherein the task includes fulfillment of a smart contract to allow the authorized user node to access the electronic asset, the smart contract including aspects of a security protocol.

7. The method of claim 1, wherein the task includes at least one of: (i) initiating allowance of the authorized user node to access the electronic asset according to one or more restrictions and (ii) initiating restriction of access to the electronic asset in response to the authorized user node failing to meet a pre-defined condition, wherein the one or more restrictions include one or more of: a predefined time interval, a geographic restriction, a location restriction, a financial restriction, a behavioral restriction, an amenity restriction, and geofencing.

8. The method of claim 1, wherein the task includes at least one of authenticating the electronic asset and configuring settings related to the electronic asset.

9. The method of claim 8, wherein the computational value corresponds to the worth of the electronic asset, and further comprising configuring an artificial intelligence (AI) module to train a model for the computational value based upon descriptive data relating to the electronic asset.

10. The method of claim 8, wherein the computational value corresponds to the score associated with the owner node or the authorized user node, and further comprising configuring an artificial intelligence (AI) module to train a model for the computational value based upon behavioral data.

11. The method of claim 1, further comprising configuring a scoring engine to track a computational value pertaining to the electronic asset, wherein the computational value corresponds to at least one of: (i) a score associated with the owner node or the authorized user node, (ii) a worth of the electronic asset, and (iii) a risk level associated with the performing of the task involving the electronic asset.

12. The method of claim 1, wherein the electronic asset includes an Internet of Things (IoT) device, and the task includes an operational action of the IoT device.

13. The method of claim 1, further comprising generating a plurality of identification (ID) non-fungible token (NFTs) and coupling respective ID NFTs thereof with corresponding electronic assets of a plurality of electronic assets, and wherein the task includes initiating allowance of the authorized user node to access multiple electronic assets of the plurality thereof.

14. A computer-based system for securely controlling an electronic asset, the system comprising:

a blockchain encoding system including:

a blockchain computing node configured to identify an asset non-fungible token (NFT) pertaining to the electronic asset, the blockchain computing node including at least one processor and a memory;

a machine learning (ML) oracle system configured to computationally evaluate an ownership status of the electronic asset according to a proof of ownership provided by an owner node, the owner node being paired with the electronic asset;

an encoder configured to respond to the ML oracle system based on the ownership status of the electronic asset by encoding the asset NFT with an embedded smart contract configured to automatically attest at least one of: (i) a representation of an identity of the owner node and (ii) a representation of an identity of an authorized user node, the authorized user node being paired with the electronic asset;

a registration node configured to register the asset NFT with the attestation of the at least one representation of the identity on a blockchain; and a computing node configured to perform a task involving the electronic asset, and the attestation of the at least one representation of the identity, in response to receiving a task request from at least one of the owner node and the authorized user node, and securely control the electronic asset.

15. The system of claim 14, wherein:

the at least one representation of the identity includes at least one identification (ID) non-fungible token (NFT); and the blockchain computing node is further configured to:

generate one or more ID NFTs respectively corresponding with one or more nodes associated with the electronic asset, the generated one or more ID NFTs including biometric identity data pertaining to the corresponding one or more nodes, the generated one or more ID NFTs further including the at least one ID NFT, the corresponding one or more nodes including the owner node and the authorized user node; and identify the asset NFT pertaining to the electronic asset by computationally performing at least one of: (i) tokenizing the electronic asset by encoding the asset NFT and (ii) importing a previously minted asset NFT pertaining to the electronic asset.

16. The system of claim 15, wherein:
the generated one or more ID NFTs respectively confer permissions upon the owner node, and upon the authorized user node, with regards to the electronic asset, such that the permissions conferred upon the owner node are broader than the permissions conferred upon the authorized user node, the permissions conferred upon the owner node including a permission to assume control of the electronic asset from the authorized user node at any time; and the task includes at least one of: (i) initiating allowance of the authorized user node to access the electronic asset according to one or more restrictions and (ii) initiating restriction of access to the electronic asset in response to the authorized user node failing to meet a pre-defined condition, wherein the one or more restrictions include one or more of: a predefined time interval, a geographic restriction, a location restriction, a financial restriction, a behavioral restriction, an amenity restriction, and geofencing.

17. The system of claim 14, wherein the blockchain encoding system further includes:
an artificial intelligence (AI) oracle system configured to verify authenticity and ownership of the electronic asset by training a model for the authenticity and ownership of the electronic asset based upon one or more external data sources.

18. The system of claim 14, wherein the task includes fulfillment of a smart contract to allow the authorized user node to access the electronic asset, the smart contract including aspects of a security protocol.

19. The system of claim 14, wherein the task includes at least one of authenticating the electronic asset and configuring settings related to the electronic asset.

20. The system of claim 14, wherein the blockchain encoding system further includes a scoring engine configured to track a computational value pertaining to the electronic asset, wherein the computational value accounts for at least one of: (i) a score associated with the owner node or the authorized user node, (ii) a worth of the electronic asset, and (iii) a risk level associated with the performing of the task involving the electronic asset.

21. The system of claim 20, wherein:
the computational value corresponds to the worth of the electronic asset; and
the blockchain encoding system further includes an artificial intelligence (AI) oracle system configured to train a model for the computational value based upon descriptive data relating to the electronic asset.

22. The system of claim 20, wherein:
the computational value corresponds to the score associated with the owner node or the authorized user node; and
the blockchain encoding system further includes an artificial intelligence (AI) oracle system configured to train a model for the computational value based upon behavioral data.

23. The system of claim 14, wherein the electronic asset includes an Internet of Things (IoT) device, and the task includes an operational action of the IoT device.

24. The system of claim 14, wherein the encoder is further configured to generate a plurality of ID NFTs, and to couple respective ID NFTs of the plurality thereof with corresponding electronic assets of a plurality of electronic assets, and wherein the task includes initiating allowance of the authorized user node to access multiple electronic assets of the plurality thereof.

25. A computer-implemented method of transferring an electronic asset from a first online environment to a second online environment, the method comprising:
importing the electronic asset from the first online environment;
storing the electronic asset in a digital vault;
identifying an asset non-fungible token (NFT) corresponding to the electronic asset;
performing an assessment of the electronic asset;
modifying the electronic asset to include the performed assessment;
generating a first code corresponding to the electronic asset;
generating a second code based on the first code, the second code being configured to cause the electronic asset to operate in the second online environment;
configuring a smart contract to securely control the electronic asset and the identified asset NFT;
pairing the identified asset NFT with the second code, the identified asset NFT being configured to unlock the second code via the configured smart contract; and
exporting the electronic asset to the second online environment.

26. The method of claim 25, wherein identifying the asset NFT corresponding to the electronic asset comprises at least one of: (i) tokenizing the electronic asset by encoding the asset NFT and (ii) importing a previously minted asset NFT corresponding to the electronic asset.

27. The method of claim 25, further comprising:
determining a first set of properties of the first online environment;
determining a second set of properties of the second online environment;
performing a comparison of the first set of properties and the second set of properties; and
based on the comparison, modifying one or more attributes of the electronic asset to ensure compatibility of the electronic asset with the second online environment.

* * * * *